(12) United States Patent
Talapin et al.

(10) Patent No.: US 12,304,829 B2
(45) Date of Patent: May 20, 2025

(54) COLLOIDAL TERNARY GROUP III-V NANOCRYSTALS SYNTHESIZED IN MOLTEN SALTS

(71) Applicant: The University of Chicago, Chicago, IL (US)

(72) Inventors: Dmitri V. Talapin, La Grange Park, IL (US); Vishwas Srivastava, Chicago, IL (US)

(73) Assignee: THE UNIVERSITY OF CHICAGO, Chicago, IL (US)

( * ) Notice: Subject to any disclaimer, the term of this patent is extended or adjusted under 35 U.S.C. 154(b) by 0 days.

(21) Appl. No.: 17/567,499

(22) Filed: Jan. 3, 2022

(65) Prior Publication Data

US 2022/0127155 A1 Apr. 28, 2022

Related U.S. Application Data

(62) Division of application No. 16/452,949, filed on Jun. 26, 2019, now Pat. No. 11,247,914.

(60) Provisional application No. 62/690,035, filed on Jun. 26, 2018.

(51) Int. Cl.
*C01G 15/00* (2006.01)
*B82Y 20/00* (2011.01)
*B82Y 30/00* (2011.01)

(52) U.S. Cl.
CPC ............ *C01G 15/003* (2013.01); *B82Y 20/00* (2013.01); *B82Y 30/00* (2013.01); *C01P 2002/01* (2013.01); *C01P 2002/72* (2013.01); *C01P 2002/82* (2013.01); *C01P 2004/04* (2013.01); *C01P 2004/64* (2013.01); *C01P 2006/60* (2013.01)

(58) Field of Classification Search
None
See application file for complete search history.

(56) References Cited

U.S. PATENT DOCUMENTS

| | | | | |
|---|---|---|---|---|
| 2006/0001119 A1* | 1/2006 | Liu | ........................ | C09K 11/88 438/93 |
| 2007/0034833 A1* | 2/2007 | Parce | .................... | C01B 19/007 252/301.36 |
| 2007/0264834 A1* | 11/2007 | Strouse | .................... | C01G 9/00 977/773 |
| 2011/0017951 A1* | 1/2011 | Ryowa | .................... | C09K 11/02 977/773 |
| 2011/0101387 A1* | 5/2011 | Kinomoto | .............. | C09K 11/65 257/89 |
| 2019/0078017 A1* | 3/2019 | Kahen | .................. | C09K 11/883 |

OTHER PUBLICATIONS

Zhang et al ("Stable colloids in molten inorganic salts", Nature, vol. 542, (2017) p. 328 published Feb. 16, 2017) (Year: 2017).*
Chatterjee et al ("Investigation of Steady-State and Time-dependent Luminescence Properties of Colloidal InGaP Quantum Dots." arXiv: Materials Science (2012)). (Year: 2012).*

* cited by examiner

*Primary Examiner* — Michael Forrest
(74) *Attorney, Agent, or Firm* — Bell & Manning, LLC

(57) ABSTRACT

Methods of synthesizing colloidal ternary Group III-V nanocrystals are provided. Also provided are the colloidal ternary Group III-V nanocrystals made using the methods. In the methods, molten inorganic salts are used as high temperature solvents to carry out cation exchange reactions that convert binary nanocrystals into ternary nanocrystals.

20 Claims, 17 Drawing Sheets

COLLOIDAL TERNARY GROUP III-V NANOCRYSTALS SYNTHESIZED IN MOLTEN SALTS

CROSS-REFERENCE TO RELATED APPLICATIONS

The present application is a divisional application of U.S. patent Ser. No. 16/452,949, filed Jun. 26, 2019, the entire contents of which are hereby incorporated herein by reference; which claims priority to U.S. provisional patent application No. 62/690,035 filed on Jun. 26, 2018, the entire contents of which are hereby incorporated herein by reference.

REFERENCE TO GOVERNMENT RIGHTS

This invention was made with government support under grant number DMR1611371 awarded by the National Science Foundation. The government has certain rights in the invention.

BACKGROUND

Group III-V compounds, including GaAs, GaN, InGaP, and InGaAs, are arguably one of the most important classes of semiconductors, along with Si, due to their direct band gaps and superior electronic properties. One of the salient features of these compounds is the ability to make alloys with desired compositions that not only allow the band gaps to be precisely tuned but also allow epitaxial growth of sandwich type architectures essential for device function. For instance, epitaxially matched InGaP/GaAs stacks are well known active layers for high efficiency solar cells. Similarly, InGaAs can be grown on an epitaxially matched InP substrate for infrared detector applications.

Solution processed colloidal semiconductor nanoparticles, also known as colloidal quantum dots (QDs), have attracted a lot of attention as building blocks for bottom-up assembly of thin film devices. Colloidal QDs of Group III-V compounds have been shown to be promising candidates for a plethora of applications such as display technology, light-emitting diodes (LEDs), photovoltaics, photodetectors, and bioimaging. In recent years, InP has replaced CdSe as the material of choice in QD-based displays due to its lower toxicity and comparable optical properties. Simultaneously, other members of the Group III-V family, such as InAs and InSb, have also seen a significant surge in interest as infrared active materials for applications like bioimaging, night vision, and telecommunication.

Even though significant advances have been made in the synthetic chemistry of colloidal Group III-V semiconductors, this technology still lags behind Group II-VI compounds. For example, whereas monodisperse nanocrystals of InP and InAs can now be achieved, colloidal GaAs nanocrystals are still difficult to synthesize and show crystalline defects when synthesized at temperatures relevant for colloidal chemistry. The more covalent character of Ga pnictides and the high oxophilicity of Ga make the synthesis of Ga containing Group III-V compounds challenging.

Ternary Group III-V nanocrystals (NCs), e.g., InGaP and InGaAs, are technologically interesting compounds due to the flexibility they offer in terms of band gap engineering. For example, an ensemble of InGaP nanoparticles emitting green light will be more efficient and stable than their InP counterparts due to their larger size, and hence larger absorption coefficients, which is directly proportional to the number of unit cells in the nanocrystal. Moreover, incorporation of Ga in the InP lattice reduces its lattice mismatch with wider gap shell materials such as ZnS, making the core-shell material less strained. Materials with a graded alloy composition are potentially interesting for applications with enhanced absorption coefficients in the blue (450 nm). From the stand point of emission, core-shell nanocrystals with a Group III-V/III-V interface are potentially better than Group III-V/II-VI core shells for optical properties due to less interfacial strain. Therefore, for the efficient incorporation of Group III-V nanocrystals into commercial technologies, the ability to engineer their composition will be essential.

Group III-V nanocrystals with ternary alloy compositions such as InGaP or InGaAs have rarely been reported. (See, Micic, et al., *The Journal of Physical Chemistry* 1995, 99 (19), 7754-7759; Park, et al., *Journal of the American Chemical Society* 2016, 138 (51), 16568-16571; and Gerbec, et al., *Journal of the American Chemical Society* 2005, 127 (45), 15791-15800. Attempts to make alloyed compositions have seen limited success. It has been shown that alloy compositions can only be achieved at a temperature of about ~400° C. (Micic et al., 1995.) Efforts to alloy Ga into InP have resulted only in the surface exchange, and no alloying was observed. (Pietra et al., *Chemistry of Materials* 2017, 29 (12), 5192-5199 and Kim et al., *Journal of the American Chemical Society* 2012, 134 (8), 3804-3809. Regarding the thermodynamics of the exchange, such temperatures are typically difficult to reach with traditional organic solvents, which either boil or decompose at temperatures above 350° C. It is also difficult to avoid side reactions such as oxidation of Ga compounds at such high temperatures.

SUMMARY

Methods of synthesizing colloidal ternary Group III-V nanocrystals are provided. Also provided are the colloidal ternary Group III-V nanocrystals made using the methods.

One embodiment of a method for forming ternary Group III-V nanocrystals includes the steps of: dispersing binary Group III-V nanocrystals in a molten inorganic salt; adding an ion-exchange additive comprising a Group III element or a group V element to the molten inorganic salt; and heating the molten inorganic salt for a time and at a temperature at which the Group III element or the Group V element of the binary Group III-V nanocrystals and the Group III element or the Group V element of the ion-exchange additive undergo cation exchange to form the ternary Group III-V nanocrystals.

BRIEF DESCRIPTION OF THE DRAWINGS

Illustrative embodiments of the invention will hereafter be described with reference to the accompanying drawings.

DETAILED DESCRIPTION

Figure 1A:
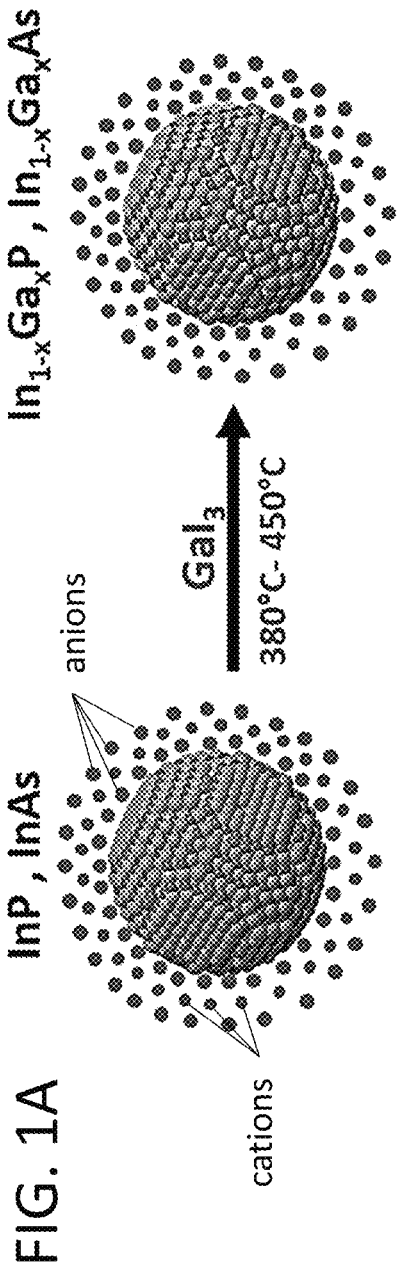
FIG. 1A depicts a schematic showing a cation exchange process in molten salts. The templating of molten salt ions around the QD surface is responsible for stabilization of QDs in molten salt. Addition of $GaI_3$ salt to the molten salt dispersion of InP or InAs QDs leads to cation exchange to form $In_{1-x}Ga_xP$ or $In_{1-x}Ga_xAs$ QDs.
Figure 1B:
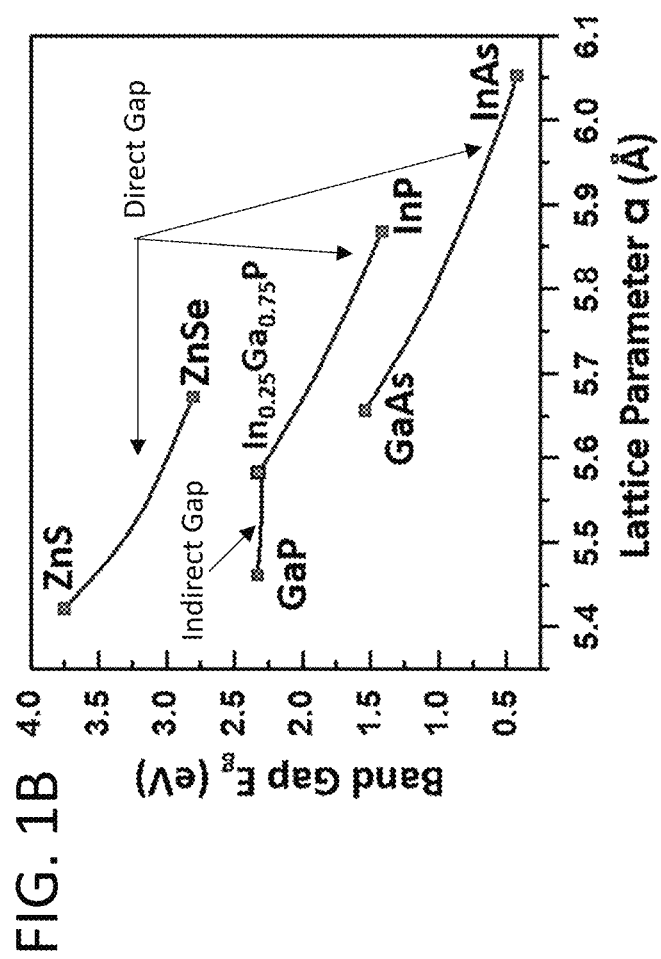
FIG. 1B depicts the lattice constants and bulk band gaps (at 0 K) of alloys of InP and GaP, InAs and GaAs, and ZnS and ZnSe. ZnS and ZnSe are typically used as the wide gap shell materials for InP QDs.

Methods of synthesizing colloidal ternary Group III-V nanocrystals are provided. Also provided are the colloidal ternary Group III-V nanocrystals made using the methods. In the methods, molten inorganic salts are used as high temperature solvents to carry out cation exchange reactions that could not be carried out using traditional colloidal solvents. This approach enables the synthesis of Group III-V nanocrystals that would otherwise be difficult or impossible to achieve in a colloidal nanocrystalline form. The ternary Group III-V nanocrystals are quantum confined and, as such, have discrete optical energy spectra that are tunable over a wide range of wavelengths.

One embodiment of a method of making Group III-V nanocrystals includes the steps of dispersing binary Group III-V nanocrystals in a molten inorganic salt; adding a salt of a Group III element or a salt of a Group V element to the molten inorganic salt; and heating the molten inorganic salt, whereby the Group III or Group V element of the added salt undergoes cation exchange with the Group III or Group V element of the binary Group III-V nanocrystals, converting the nanocrystals into ternary Group III-V nanocrystals. (Alternatively, in the case of the Group V elements, a gaseous Group V element-containing compound, such as $NH_3$ or $PH_3$, can be used as an exchange agent, rather than a salt.) Using this method, binary Group III-V nanocrystals can be transformed into ternary Group III-V nanocrystals without a significant change in their sizes or morphologies. The ternary Group III-V nanocrystals have optical properties that render them well suited for use in a variety of optoelectronic applications, including display devices. These optical properties can be tuned by adjusting the particle size of the starting binary nanocrystals and/or by tailoring the extent of the cation exchange and, therefore, the precise composition of the ternary alloys, as illustrated in the Example.

As used herein, the term "nanocrystal" or "nanoparticle" refers to an inorganic particle having a largest cross-sectional dimension of no greater than 1000 nm. This includes particles having a largest cross-sectional dimension of no greater than 100 nm and further includes particles having a largest cross-sectional dimension of no greater than 10 nm. In some embodiments, the largest cross-sectional dimension is in the range of about 1 nm to about 10 nm. When the nanocrystals are present as a plurality of nanocrystals, these dimensions refer to the average largest cross-sectional dimension for the collection of nanocrystals. The nanocrystals can also be referred to as QDs.

A variety of molten inorganic salts may be used to form the colloidal ternary Group III-V nanocrystals. The molten inorganic salt may be a mixture (e.g., a eutectic mixture) of two or more different inorganic salts. The selected molten inorganic salt should be one in which the binary Group III-V nanocrystals can be dispersed and that has a high solubility for the salt of the Group III or Group V element. In addition, the molten salt is desirably stable at high temperatures (e.g., temperatures >350° C.), has a low vapor pressure, and is inert to (i.e., does not interfere with) the cation exchange reaction between the binary nanocrystals and the salt of the Group III or Group V element. In addition, the molten inorganic salt may be one that exhibits sufficient binding affinity for the binary and ternary Group III-V nanocrystals so as to form a homogeneous, uniform dispersion of the nanocrystals throughout the molten inorganic salt. At least in some cases, this binding affinity may be sufficient to achieve the homogeneous, uniform dispersion even in the absence of any organic capping ligands associated with the nanocrystals. The phrase "binding affinity" can refer to the formation of covalent bonds or non-covalent (e.g., hydrogen bonds) between the molten inorganic salt (or a component thereof) and the nanocrystals.

In some embodiments, the molten inorganic salt is characterized by a melting point ($T_m$) of below 350° C. This includes embodiments in which the molten inorganic salt has a $T_m$ in the range of from about 50° C. to less than 350° C.

Suitable molten inorganic salts include metal halides, such as mixed metal halides, and thiocyanate salts. Specific examples of metal halides include CsBr—LiBr—KBr mixtures; LiCl—LiBr—KBr mixtures; LiCl—LiI—KI mixtures; and $ZnCl_2$—NaCl—KCl mixtures. NaSCN—KSCN mixtures can also be used.

The colloids may be characterized as having a homogeneous and uniform dispersion of the ternary Group III-V nanocrystals throughout the continuous phase (i.e., the molten salt). Although the binary Group III-V nanocrystals initially may have organic capping ligands bound to their surfaces, these organic capping ligands may be displaced with components (e.g., ions) from the molten media while still providing a stable dispersion. Generally, if the molten media has sufficiently strong binding affinities for the binary Group III-V nanocrystals, the organic capping ligands on the nanocrystals can be partially, completely, or substantially completely displaced by the ion of the molten media. In other embodiments, the colloids are formed using bare binary Group III-V nanocrystals, e.g., binary Group III-V nanocrystals from which the organic ligands have been stripped. Optionally, the organic ligands can be partially or completely replaced by inorganic ligands, such as sulfide ligands ($S^{2-}$ anions), that enhance the solubility of the binary Group III-V nanocrystals in the molten salt.

Due to the replacement of organic capping ligands or the use of bare binary Group III-V nanocrystals, the colloids can be substantially free of organic capping ligands. By "substantially free" it is meant that the colloid is completely free of such ligands or such ligands are present in such a small amount so as to have no material effect on the colloid. Similarly, in some embodiments, the colloids may be characterized as being substantially free of any capping ligands (e.g., inorganic capping ligands) other than those provided by the components of the molten medium itself.

Colloidal dispersions of the starting binary Group III-V nanocrystals can be made by interfacing the molten inorganic salt with the binary Group III-V nanocrystals dispersed in an organic solvent and stirring, whereby the binary Group III-V nanocrystals undergo phase transfer from the organic solvent to the molten inorganic salt. Alternatively, the colloids can be made by mixing the binary Group III-V nanocrystals in a non-polar solvent with the molten inorganic salt or through a "solvent-free" method. Details of these methods are described in the Example below and in PCT application publication number WO/2017105662, which is incorporated herein for the purpose of describing methods of forming colloids of inorganic nanocrystals in molten media.

Once a colloidal dispersion of the Group III-V nanocrystals has been formed, an ion exchange additive that includes a Group III element or a Group V element can be added to the dispersion at a temperature and for a time sufficient to exchange ions of the ion exchange additive with ions of the binary Group III-V nanocrystals, thereby converting the binary Group III-V nanocrystals into ternary Group III-V nanocrystals. The ion exchange additive may be a salt, or other compound, of a Group III element or a Group V element, wherein the Group III element or Group V element of the salt differs from the Group III element or Group V element of the binary nanocrystals. In some embodiments, the salt is a halide salt of a Group III or Group V element. As illustrated in the Example, the chemical content of the ternary Group III-V nanocrystals can be controlled by tailoring the degree of cation exchange through control of the time and/or temperature of the exchange reaction. By way of illustration, the cation exchange reaction can be carried out at temperatures in the range from 350° C. to 500° C., including temperatures in the range from 380° C. to 450° C., and/or for times ranging from one hour to six hours. However, temperatures and times outside of these ranges can be used.

$In_{1-x}Ga_xP$ (0<x<1) nanocrystals are examples of nanocrystals that can be made using cation exchange in a molten inorganic salt medium. These ternary Group III-V nanocrystals can be formed starting with InP nanoparticles dispersed in, for example, a molten NaSCN/KSCN mixture or a molten CsBr:KBr:LiBr mixture to which a gallium halide salt, such as $GaI_3$, is added. The degree of cation exchange can be controlled through the reaction temperature, with higher temperatures corresponding to a larger degree of exchange. For example, by adjusting the reaction temperature from about 380° C. to about 425° C., nanocrystals with x in the range from about 0.2 to about 0.85 can be obtained. The ability to synthesize colloidal $In_{1-x}Ga_xP$ nanocrystals with good optical properties is advantageous because $In_{1-x}Ga_xP$ nanocrystals are better suited for display applications than are InP particles, as illustrated in the Example.

$In_{1-x}Ga_xAs$ (0<x<1) nanocrystals also can be made using cation exchange in a molten inorganic salt medium. These ternary Group III-V nanocrystals can be formed starting with InAs nanoparticles dispersed in, for example, a molten NaSCN/KSCN mixture or a molten CsBr:KBr:LiBr mixture to which a gallium halide salt, such as $GaI_3$, is added. The degree of cation exchange can be controlled through the reaction temperature, with higher temperatures corresponding to a larger degree of exchange. For example, by adjusting the reaction temperature from about 400° C. to about 500° C., $In_{1-x}Ga_xAs$ nanocrystals with x in the range from about 0.05 to about 0.75 can be obtained. Notably, using the present methods, colloidal $In_{1-x}Ga_xAs$ nanocrystals with a strong band edge emission in the near infrared range of 750 nm-1000 nm can be fabricated.

The colloids may be characterized by their stability as evidenced by the maintenance of a homogeneous and uniform distribution of nanocrystals throughout the molten medium over a period of time. Colloidal stability may be measured visually (e.g., photographs), by using TEM images, or SAXS data. At least some embodiments of the colloids are stable under an inert atmosphere for at least a month or two or more months. For longer storage, composites may be formed by solidifying the colloids. Such composites may be reheated to the molten state, thereby reforming a colloid characterized by a homogeneous and uniform distribution of nanocrystals throughout the molten medium.

In the ternary Group III-V nanocrystals the cations that are involved in the cation exchange are alloyed; that is, they coexist in the same crystal domain, rather than being segregated in two or more different domains that have different material compositions. Thus, a ternary Group III-V nanocrystal is distinguishable from a nanocrystal heterostructure, such as a core-shell nanocrystal, in which the two cations that undergo the cation exchange end up segregated in different domains. However, the Group III-V nanocrystals can be incorporated into core-shell structures by growing a shell around the Group III-V nanocrystals. Thus, in some embodiments of the methods, the colloidal Group III-V nanocrystals are used as media for forming core-shell nanocrystals. In such embodiments, the chemical transformation involves forming a shell over the inorganic Group III-V nanocrystals of the colloid. Growth of a thin wide band gap semiconductor shell over nanocrystal cores is a strategy used to improve the optical properties of semiconductor QDs. However, shell growth can be challenging. Efficient shell growth methods typically require highly air-free conditions and high temperature so as to avoid incorporating structural defects at the core-shell interface, which can negatively affect emission properties. Shell growth can be particularly challenging in the case of Group III-V semiconductors which are prone to the formation of oxides.

One embodiment of a method for forming core-shell nanocrystals comprises adding a shell precursor to the colloidal Group III-V nanocrystals at a temperature and time sufficient to form a shell over the nanocrystals of the colloid. The shell may be composed of a semiconductor, e.g., a different group III-V semiconductor, or a group II-VI semiconductor. For example, a ZnS shell can be formed on an $In_{1-x}Ga_xP$ core or a CdS shell can be formed on a $In_{1-x}Ga_xAs$ core, as illustrated in the Example.

The Group III-V nanocrystals can be removed from the molten salt medium by washing with an organic solvent and/or carrying out a phase transfer into an organic solvent, followed by separating the nanocrystals from the solvent phase.

The Group III-V nanocrystals, including core-shell nanocrystals having a Group III-V core, can be used in a variety of optoelectronic devices. For example, the nanocrystals can be used as photodetectors, whereby incident radiation of a first wavelength or range of wavelengths is absorbed by the ternary Group III-V nanocrystals, inducing them to emit PL of a second wavelength or range of wavelengths. The absorption and PL spectra of the nanocrystals will depend on their chemical composition. However, by way of illustration, $In_{1-x}Ga_xP$ (0<x<1) nanocrystals can absorb blue light and emit green and/or red PL, with a PL peak having a full width half maximum of 60 nm or lower, including 50 nm or lower.

EXAMPLE

This example describes a molten salt-based approach for the synthesis of ternary InGaP and InGaAs NCs via cation exchange reactions performed on pre-synthesized InP and InAs NCs (FIG. 1A). The resultant cation exchanged particles show absorption and emission features that are blue shifted in comparison to the starting materials. Bright luminescence from core-shell nanocrystals of InGaP/ZnS is also demonstrated, and its optical properties are compared with those of InP nanoparticles.

Experimental Section; Results and Discussions; Structural Properties

Colloidal InP and InAs QDs can be dispersed in a variety of inorganic salt eutectics (Table 1) such as NaSCN/KSCN (26.3:73.7 mol %, m.p. 137° C.) or CsBr:LiBr:KBr (25:56.1:18.9 mol %, m.p. 236° C.). The native organic ligands were first removed from the QD surface by either using $HBF_4$ as the stripping agent or by decorating the QDs surface with short inorganic $S^{2-}$ ligands. Dried powders of organic ligand-free QDs were stirred in the molten salt at temperatures slightly above their melting point for prolonged periods to obtain stable dispersions. The dispersions of InP and InAs QDs in molten CsBr:LiBr:KBr were stable at temperatures well beyond 400° C. At these temperatures, traditional organic solvents and surface ligands either boil or decompose. The stability of QDs in molten salts can be attributed to the ability of the salt anions and cations to form strongly ordered templates around the nanocrystal surface (FIG. 1A). Both halide and $SCN^-$ ions bind to the surface of III-V nanocrystals, which is essential to induce enhanced ordering of the ions.

TABLE 1

Molten Salt and QD combinations tested in the Example

| Eutectic Composition (% mol) | Melting Temperature | QDs dispersed |
| --- | --- | --- |
| CsBr:LiBr:KBr = 25:56.1:18.9 | 236° C. | InP, InAs |
| KSCN:NaSCN = 73.7:26.3 | 140° C. | InP, InAs |
| $ZnCl_2$:NaCl:KCl = 60:20:20 | 203° C. | InP |

To perform cation exchange reactions on III-V QDs, the CsBr:LiBr:KBr eutectic was chosen due to its high temperature stability, low vapor pressure, high solubility of Group III halides, and inertness to InP and InAs QDs. QDs capped with sulfide ligands showed better stability in this eutectic mixture and also did not show Ostwald ripening in these salts. A desired amount of $GaI_3$ salt (m.p.=212° C.) was added to the QD/molten salt solution and it was stirred for 2 hours (h) at ~250° C. to allow homogenization. The mixture was then transferred to a furnace and heated to 380° C.-450° C. for an hour. According to the HSAB principle, the softer $In^{3+}$ should have a higher preference than $Ga^{3+}$ for the soft iodide ion favoring the exchange. The reaction mixture was cooled down to room temperature and the salt was removed by repeated washing using formamide (FA) in inert atmosphere. The centrifuged product was then dispersed in FA using sulfide ligands and transferred to toluene phase using didodecyldimethylammonium bromide (DDAB) as the phase transfer agent to obtain a colloidal solution which was stable for months.

Figure 2B:
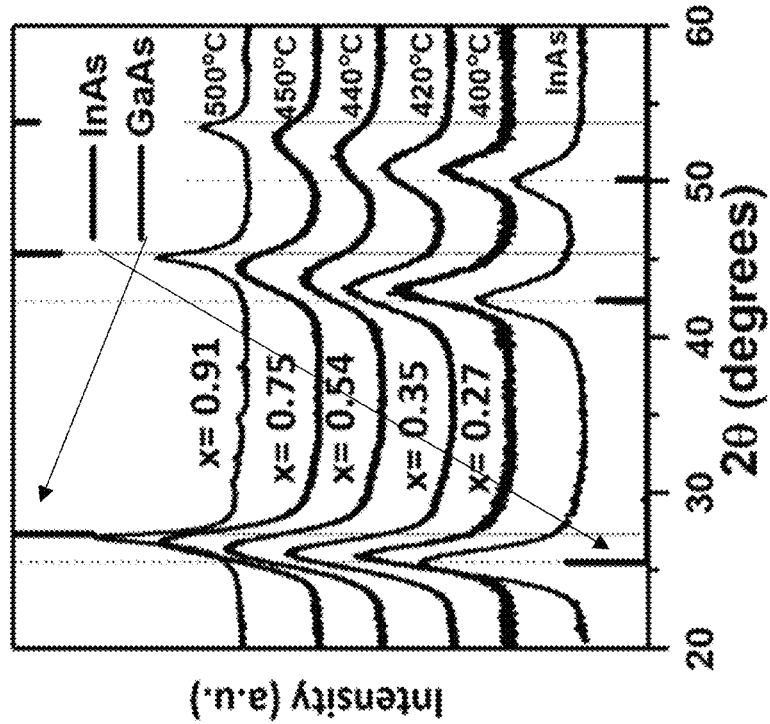
FIGS. 2A and 2B depict X-ray diffraction (XRD) patterns of $In_{1-x}Ga_xP$ and $In_{1-x}Ga_xAs$ alloy QDs (also referred to as nanocrystals) obtained by cation exchange at different temperatures. The vertical lines show the positions and intensities of X-ray reflections of bulk InP, GaP, InAs, and GaAs.
Figure 2A:
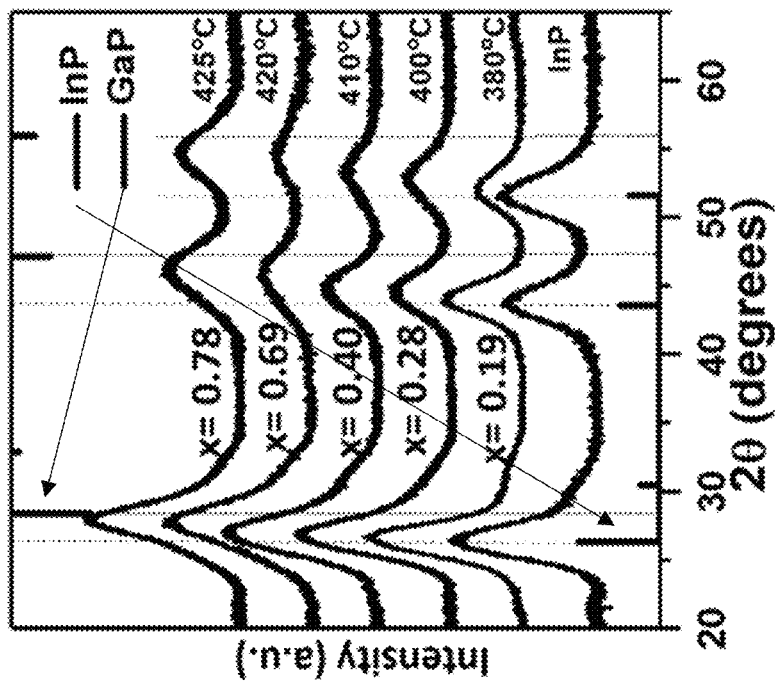
Figure 2D:
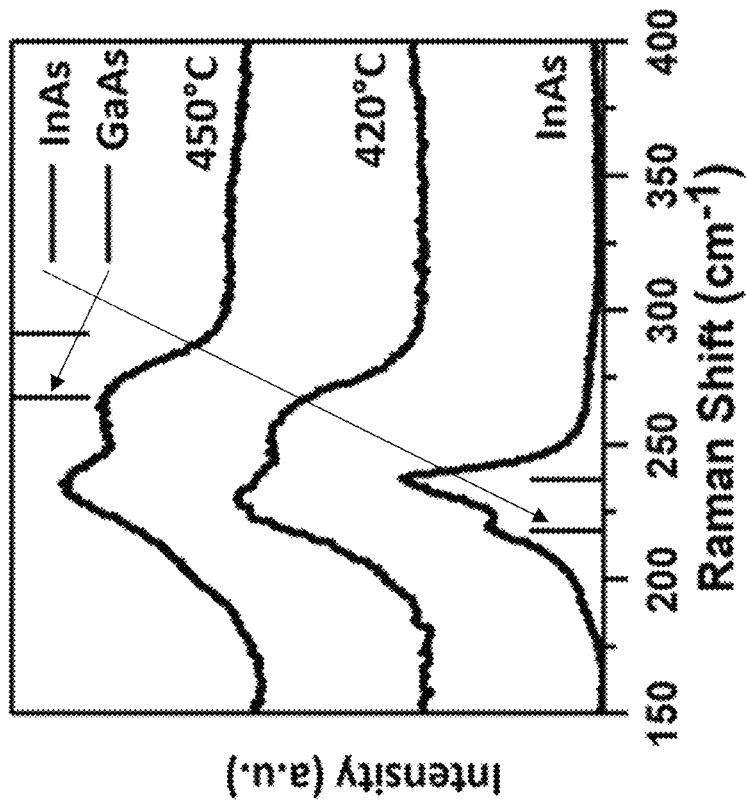
FIGS. 2C and 2D depict Raman spectra of $In_{1-x}Ga_xP$ and $In_{1-x}Ga_xAs$ alloy QDs, respectively, obtained by cation exchange at different temperatures. The vertical lines show the corresponding TO and LO phonon modes of bulk InP, GaP, InAs, and GaAs.
Figure 2C:
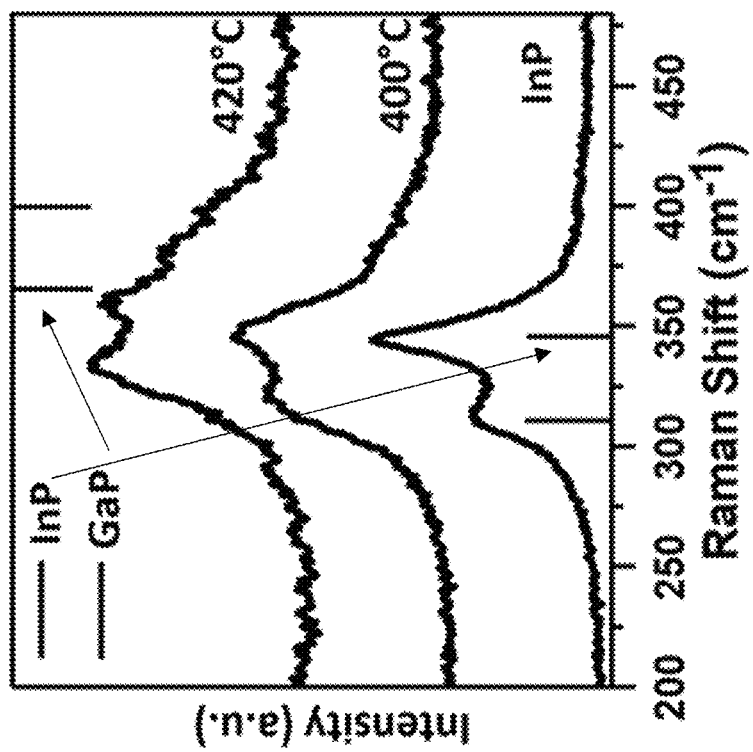

Gallium pnictides are thermodynamically more stable than their corresponding indium pnictides. For example, the standard heat of formation of GaP and InP is -103.2 kJ/mol and -70.2 kJ/mol, respectively (-87.7 kJ/mol and -60 kJ/mol for GaAs and InAs). Therefore, the cation exchange is only diffusion limited and can be accelerated by increasing the reaction temperature. The extent of Ga incorporation in the QDs could indeed be controlled by the temperature at which the exchange was performed. FIG. 2A shows XRD patterns of $In_{1-x}Ga_xP$ nanocrystals with varying compositions obtained from cation exchange at temperatures ranging from 380° C.-430° C. A consistent shift of all X-ray reflections to higher 2θ values was observed with increasing temperature, which indicates increasing Ga incorporation into the lattice with temperature. Similar results were obtained for $In_{1-x}Ga_xAs$ NCs (FIG. 2B); however, the temperature range needed for Ga incorporation was 400° C.-450° C. No change in XRD patterns was observed when the particles were annealed in the absence of $GaI_3$. The full width at half maximum (fwhm) of the (111) diffraction peak did not appreciably change when the cation exchange reactions were performed at temperatures below 450° C., indicating that the QDs did not grow or etch significantly. Although the composition could be driven almost completely to the GaAs phase when the exchange was performed at 500° C., it was accompanied by significant narrowing of the diffraction peaks, indicative of an increase in the particle size. The composition of the alloy was estimated from the lattice parameters using the Vegard's law (FIGS. 2A and 2B). Inductively coupled plasma optical emission spectrometry (ICP-OES) analysis of the QDs was found to be in a good agreement with the compositions estimated from the XRD patterns. Further insight into the nature of alloying could be obtained from Raman spectroscopy. FIGS. 2C and 2D show the Raman spectra for different alloy compositions of $In_{1-x}Ga_xP$ and $In_{1-x}Ga_xAs$ QDs. A continuous one-mode shift in the TO and LO phonon modes of the parent InP and InAs phase could be seen for $In_{1-x}Ga_xP$ and $In_{1-x}Ga_xAs$ QDs with increasing Ga incorporation, indicating that the alloy QDs did not have phase segregated domains of InP and GaP. The TO and LO phonon features for the alloys with a higher Ga component showed significant broadening, indicating the lack of a long-range order between In and Ga sub-lattices in the alloy QDs.

Figure 3B:
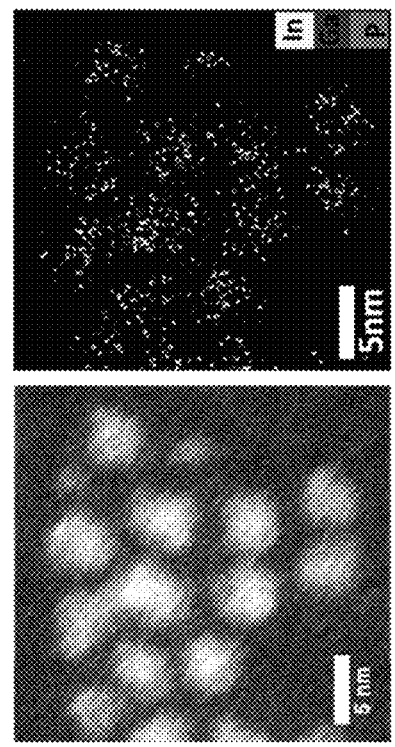
FIG. 3B depicts an energy dispersive X-ray map and the corresponding STEM image showing a homogenous distribution of indium and gallium in every particle. For Ga and P, the Kα edge was measured whereas for In, the Lα edge was measured.
Figure 3A:
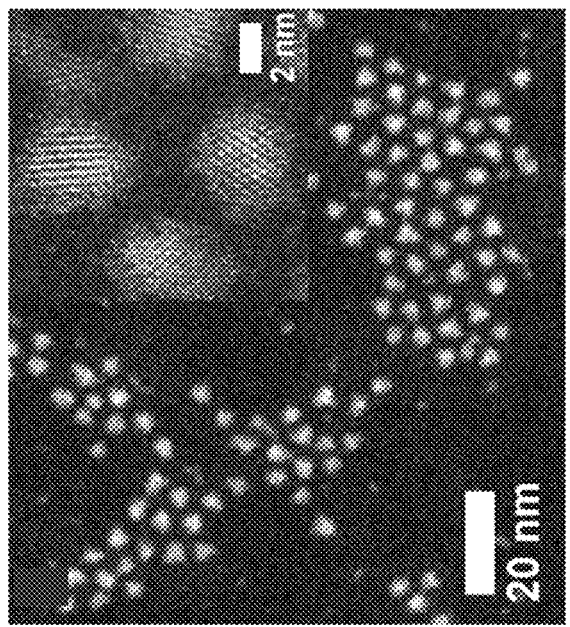
FIG. 3A depicts a scanning transmission electron microscope (STEM) image of $In_{1-x}Ga_xP$ QDs. The inset shows a high-resolution STEM image with clearly visible lattice fringes.
Figure 3D:
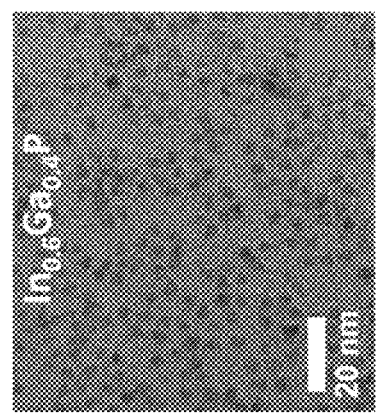
FIGS. 3C and 3D depict TEM images of InP QDs and the $In_{0.6}Ga_{0.4}P$ alloy QDs.
Figure 3C:
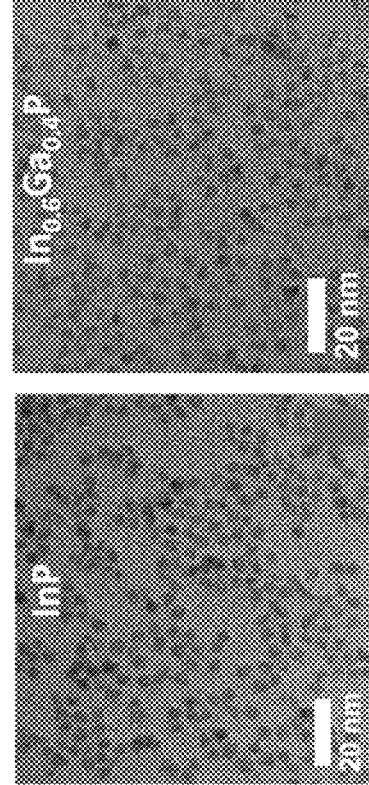
Figure 3E:
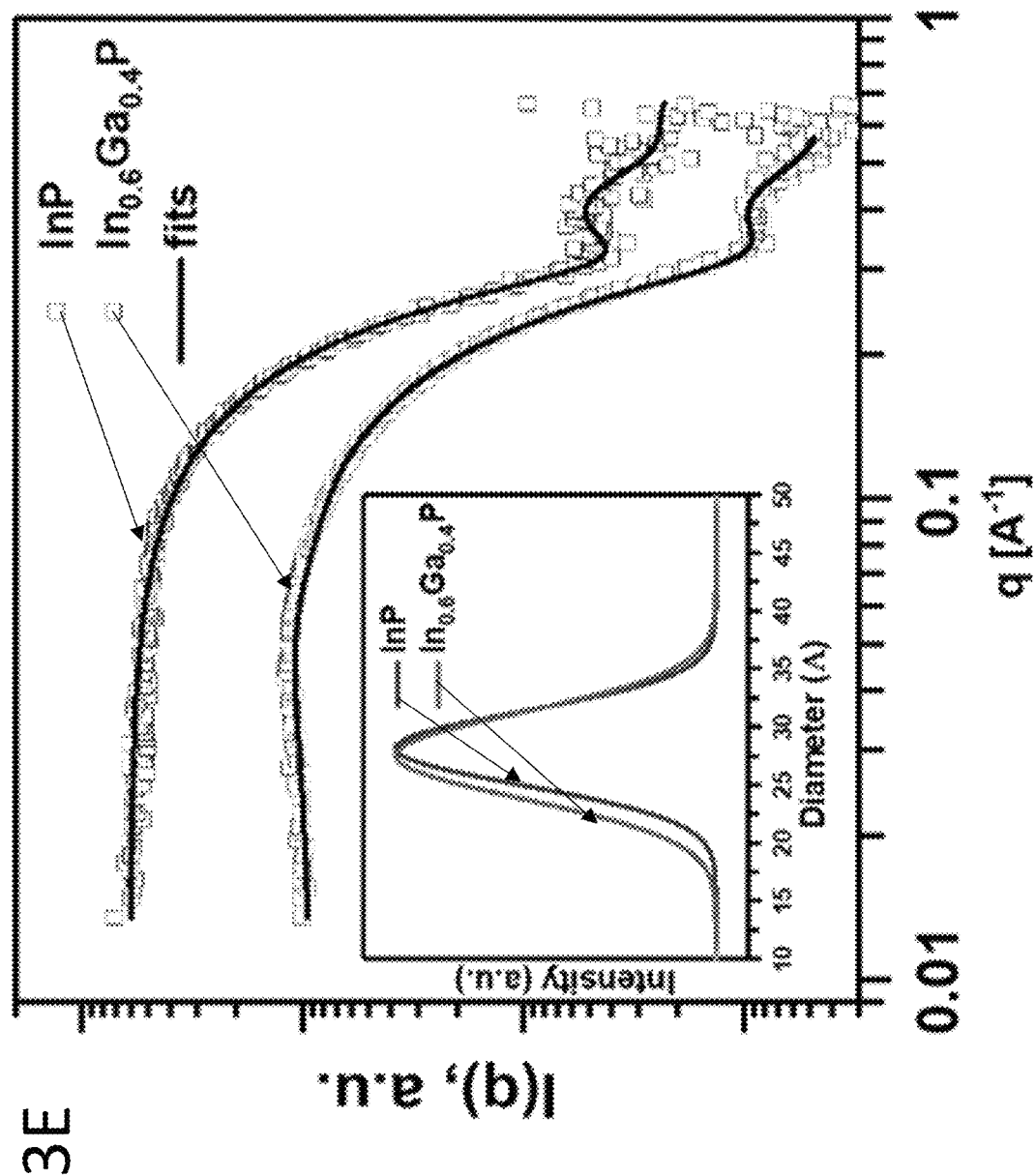
FIG. 3E depicts experimental small-angle X-ray scattering (SAXS) curves (open squares) and the fits (black lines) for InP and $In_{0.6}Ga_{0.4}P$ QDs. The inset shows the size distributions extracted from the fits.
Figure 8B:
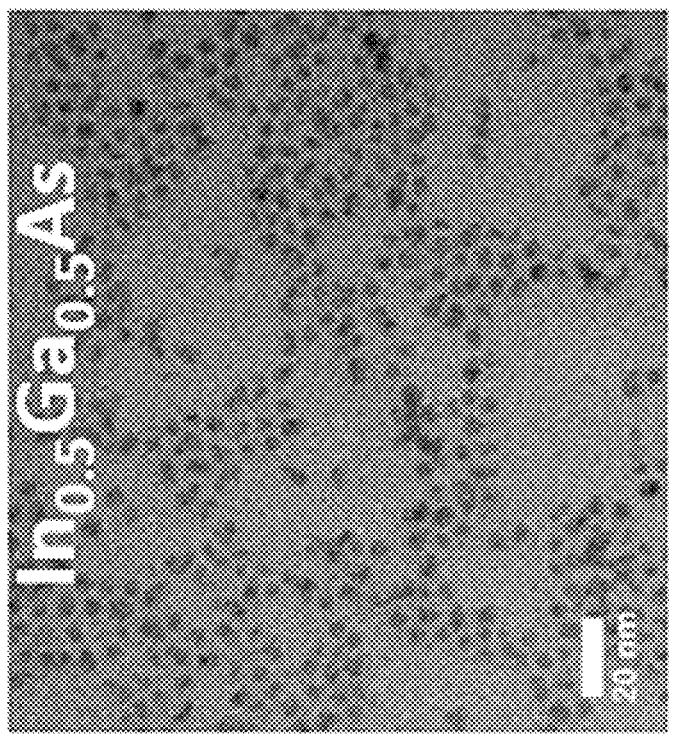
FIGS. 8A and 8B depict TEM images of (FIG. 8A) starting InAs and (FIG. 8B) resultant $In_{0.5}Ga_{0.5}As$ QDs obtained by cation exchange performed at 450° C.
Figure 8A:
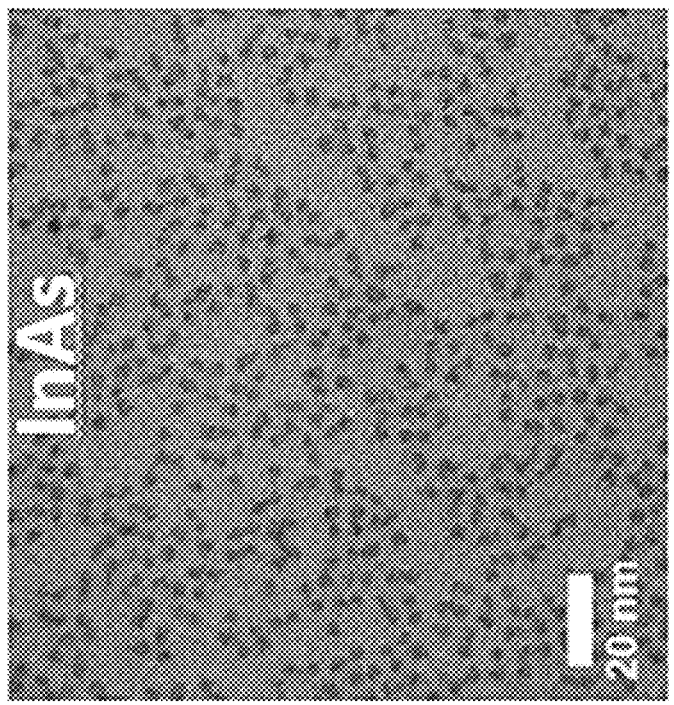
Figure 9B:
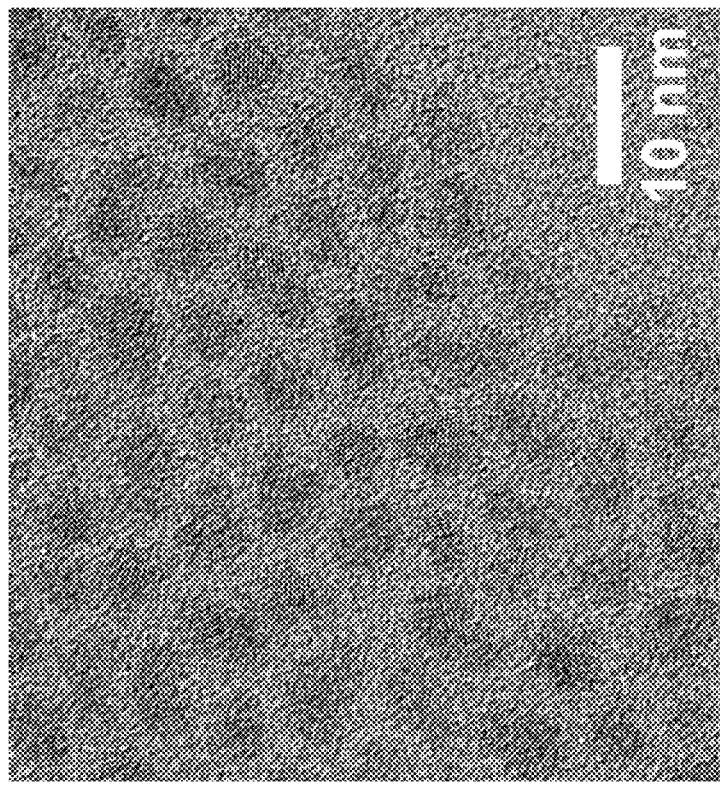
FIG. 9B depicts an HR-TEM image of $In_{1-x}Ga_xAs$ alloy QDs.
Figure 9A:
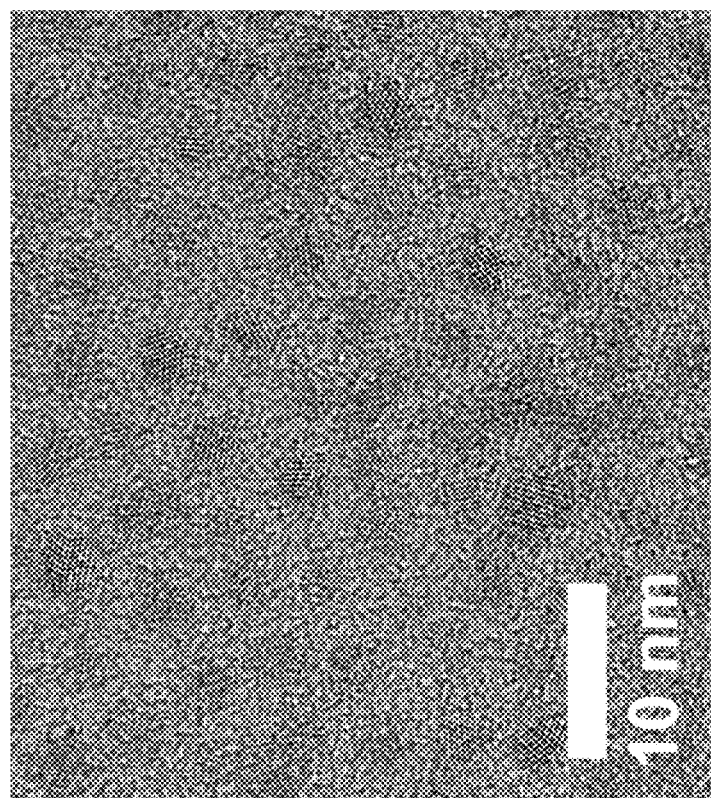
FIG. 9A depicts an HR-TEM image of $In_{1-x}Ga_xP$ alloy QDs.

The morphology of the alloy $In_{1-x}Ga_xP$ and $In_{1-x}Ga_xAs$ QDs was characterized using electron microscopy. FIG. 3A shows a representative STEM image of $In_{1-x}Ga_xP$ QDs. A high-resolution STEM image showing clear lattice fringes is shown in the inset. The homogeneity of structural alloying is further supported by high resolution energy dispersive X-ray (EDX) chemical mapping of $In_{1-x}Ga_xP$ QDs (FIG. 3B). The presence of both indium and gallium could be detected in each individual QD without any apparent phase segregation. Elemental line scans on individual QDs show a STEM-EDS map of an individual $In_{1-x}Ga_xAs$ QD showing the presence of both In and Ga atoms in it. A significant change was not observed in the size of QDs upon cation exchange. FIGS. 3C and 3D show TEM images of the starting InP QDs and the resultant $In_{0.6}Ga_{0.4}P$ QDs obtained after cation-exchange at 410° C. for comparison. SAXS analysis was employed to quantitatively study the change in the size and size distribution of the QDs upon cation exchange (FIG. 3E). The average size of $In_{0.6}Ga_{0.4}P$ QDs shrunk by ~3%, which is consistent with the change in volume expected due to the smaller unit cell of GaP compared to InP ($a_{InP}$=0.586 nm and $a_{GaP}$=0.545 nm). The size distribution of 11% for the initial InP dots increased to 13.5% after the cation exchange. Similar results were obtained when cation exchange was performed on InAs QDs. TEM images of $In_{0.5}Ga_{0.5}As$ QDs and the starting InAs QDs are shown in FIGS. 8A and 8B. High resolution TEM (HRTEM) images of $In_{1-x}Ga_xP$ and $In_{1-x}Ga_xAs$ QDs are shown in FIGS. 9A and 9B. The distance between (111) reciprocal lattice points was estimated from the Fourier transform of the HRTEM image of an individual alloy QD, which pointed to the shrinking of unit cell dimension from a=5.9 Å to a=5.6 Å.

Figure 4B:
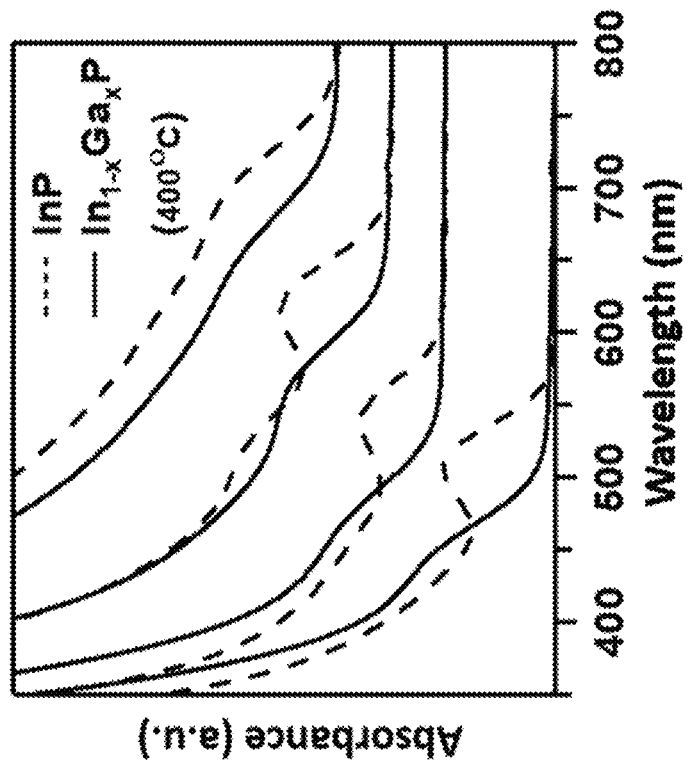
FIG. 4B depicts absorption spectra of different sizes of InP QDs (dotted lines) and $In_{1-x}Ga_xP$ QDs (solid lines) obtained from the InP QDs after a cation exchange reaction at 400° C.
Figure 4A:
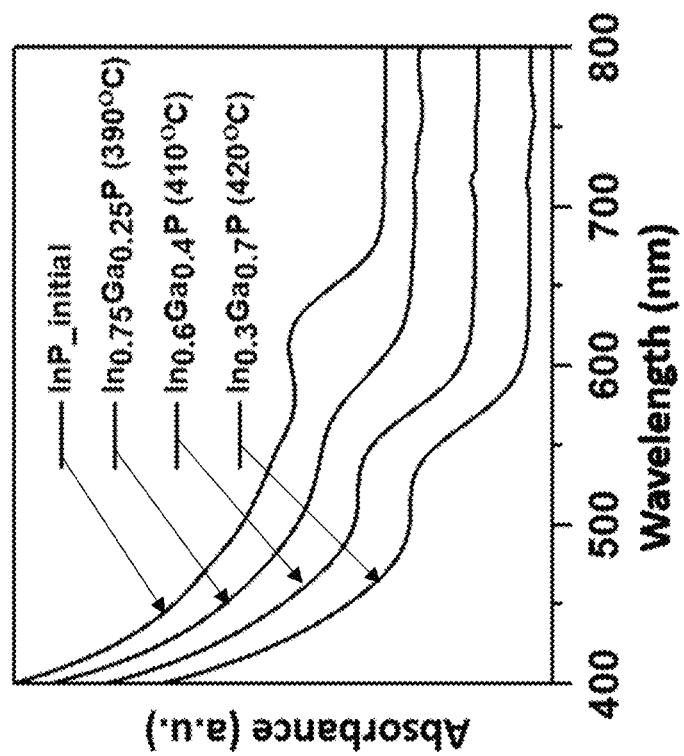
FIG. 4A depicts absorption spectra of starting InP QDs and $In_{1-x}Ga_xP$ QDs synthesized from InP QDs at different temperatures.

Next, the effect of Ga incorporation on the optical properties of InP QDs was studied. Alloyed $In_{1-x}Ga_xP$ QDs are expected to show continuously blue shifted absorption with increasing Ga content as compared to InP QDs of the same size, owing to the larger band gap of GaP ($E_{g,bulk}$=2.3 eV(indirect)/2.77 eV(direct)) as compared to InP ($E_{g,bulk}$=1.34 eV). FIG. 4A shows the absorption spectra of $In_{1-x}Ga_xP$ QDs synthesized at different temperatures. The excitonic features were continuously blue shifted with increasing values of x for $In_{1-x}Ga_xP$ alloy QDs. No blue shift of absorption was observed when InP QDs were annealed in molten salts without $GaI_3$. Similar blue shifts were observed upon alloying in InP QDs of all sizes (FIG. 4B). The extent of blue shift was found to vary for different QD sizes and was not linearly correlated to the % of Ga in the lattice, which can be attributed to the band-bowing effect in ternary $In_{1-x}Ga_xP$.

The absorption features for the alloy QDs are generally broader as compared to the starting materials, which can be attributed to two factors: (1) there may be some heterogeneity in the distribution of Ga in the ensemble, and (2) a slight change in size distribution is also observed after cation exchange. Both these factors can be mitigated by mechanical stirring of the reaction mixture during the high temperature cation exchange. Further optimization and scale up of this process can result in better size dispersions. Mild size-selective precipitation was used to partially eliminate the effect of ensemble heterogeneity on the optical properties of the alloy QDs. Size-selective precipitation allowed for the separation of the particles into smaller batches with tighter size distributions and narrower excitonic features. The absorption features for a size-selected fraction of $In_{0.6}Ga_{0.4}P$ QDs and InP QDs were slightly broader for the alloy QDs as compared to the binary phase, which can be attributed to either heterogeneity in Ga incorporation or intrinsic differences in the exciton fine structure.

Figure 4D:
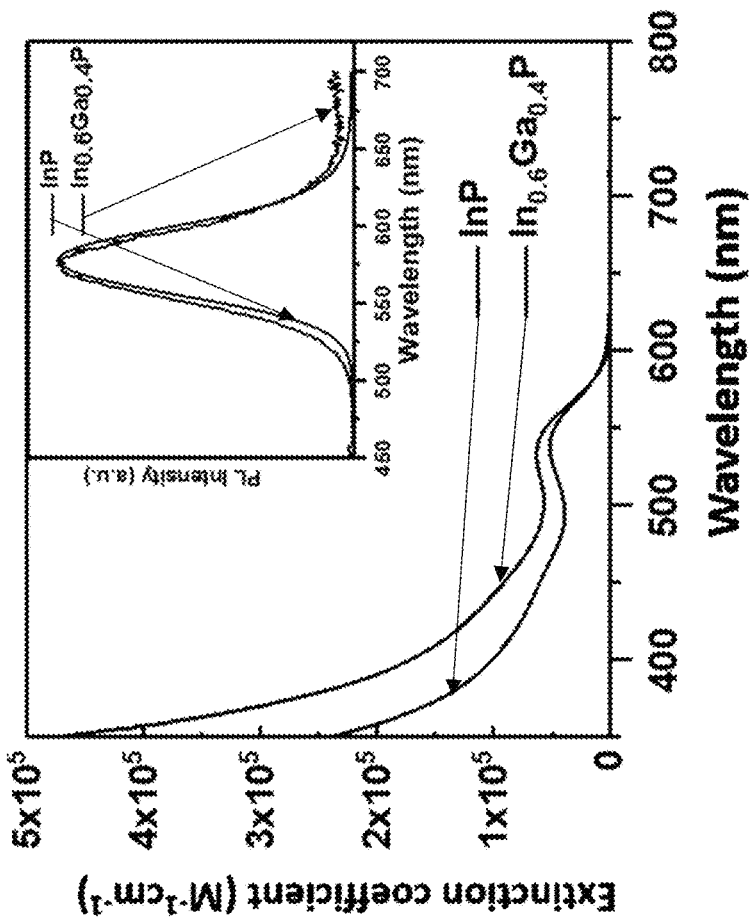
FIG. 4D depicts a comparison of molar extinction coefficients (per particle) of InP and $In_{0.6}Ga_{0.4}P$ QDs with similar emission profiles (see inset).
Figure 4C:
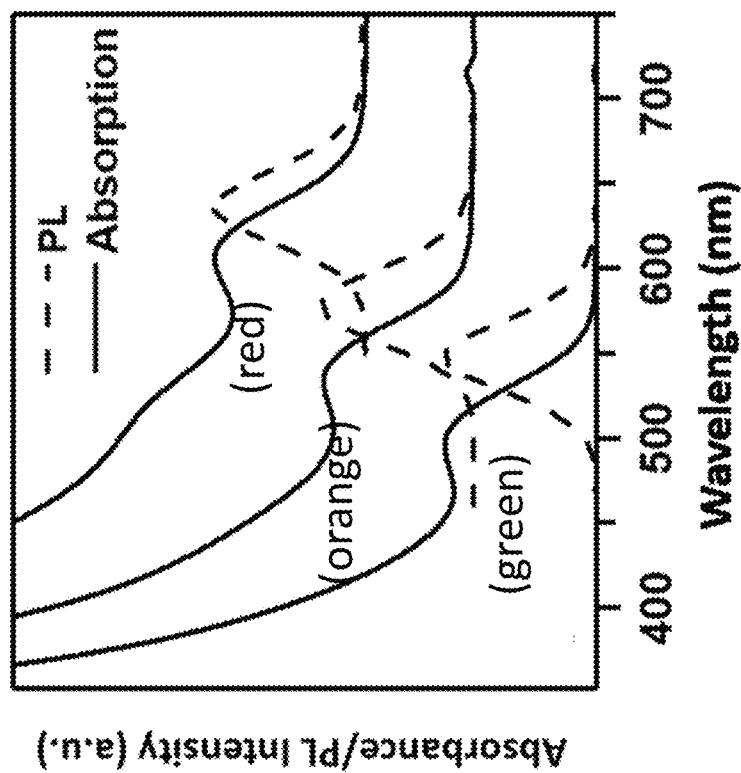
FIG. 4C depicts absorption and emission spectra of representative size-selected $In_{1-x}Ga_xP$ QDs showing stokes shifts of the emission bands. The full-width half maximum of the emission bands was 48 nm (green), 50 nm (orange) and 51 nm (red).

As-synthesized $In_{1-x}Ga_xP$ QDs also showed band-edge emission, which was blue shifted as compared to the starting InP NCs. FIG. 4C shows representative emission spectra of alloy $In_{1-x}Ga_xP$ QDs with their corresponding absorption spectra. The full width at half maximum for the PL band was less than 50 nm for all size ranges. The Stokes shift for $In_{1-x}Ga_xP$ QDs is comparable to that obtained for InP particles emitting at similar wavelengths. The molar extinction coefficient of $In_{0.6}Ga_{0.4}P$ alloy QDs was also estimated, and it was compared to InP QDs with a similar emission spectrum as that of the alloy QDs (FIG. 4D). The extinction coefficient per particle for the alloy QDs was found to be significantly higher than that of InP QDs in the blue spectral range. This is expected since the extinction coefficients of QDs scale linearly with the number of unit cells, which is higher for InGaP than InP for the same QD size. The absorption cross-section at 450 nm for the alloy QDs with emission maxima centered at 576 nm was found to be 1.5 times that of InP QDs emitting at the same wavelength. This is of great significance for display applications where blue light is used to excite the green and red emitting QD phosphors.

Figures 5A, 5B:
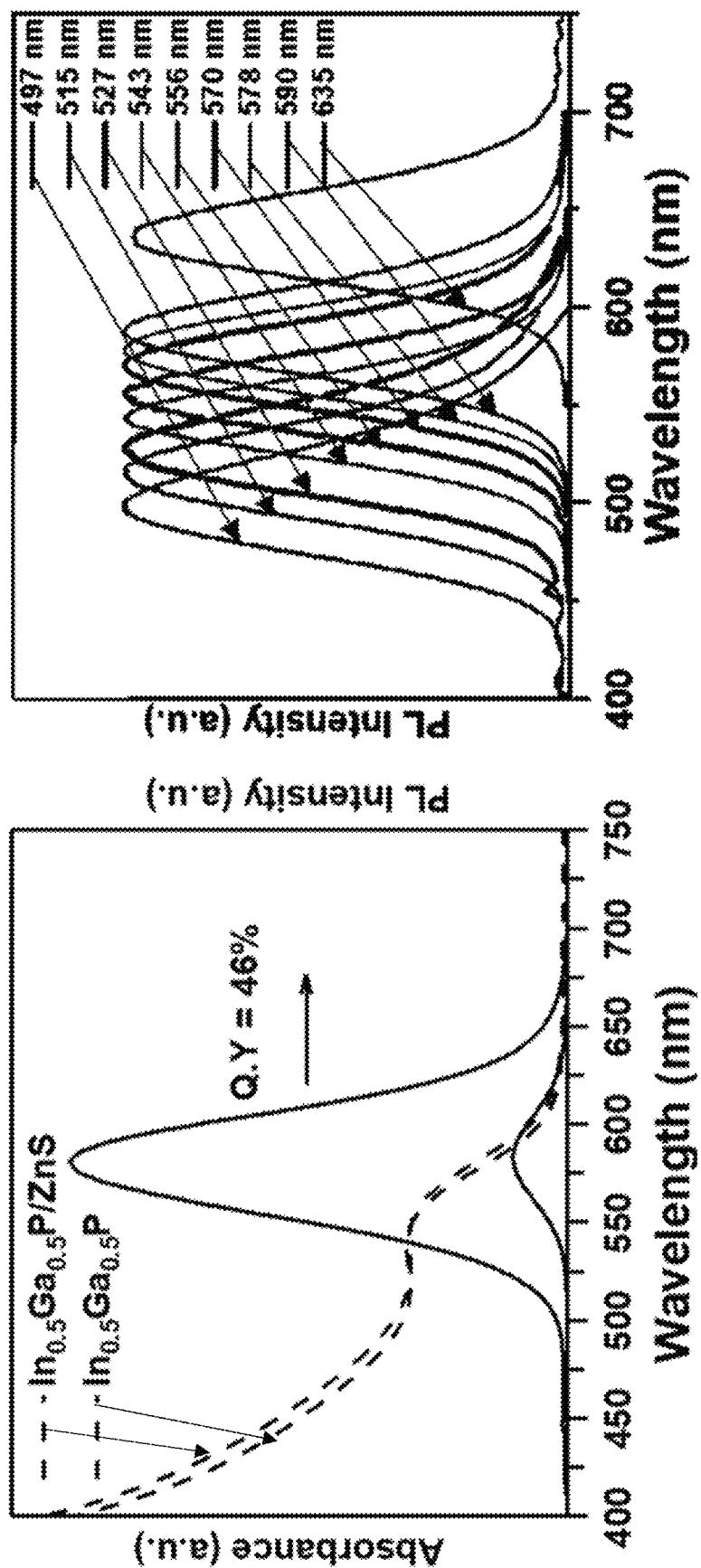
FIG. 5A depicts absorption and photoluminescence (PL) spectra of $In_{0.5}Ga_{0.5}P$ QD core (solid and dashed) and $In_{0.5}Ga_{0.5}P/ZnS$ core-shell QDs (solid and dashed). The PL spectra depict the relative change in PL intensity upon shell growth.
FIG. 5B depicts representative PL spectra of $In_{1-x}Ga_xP/ZnS$ core-shell QDs extending the range between ~490 nm and 640 nm, showing the range of emission wavelengths accessible by this material.
Figure 5D:
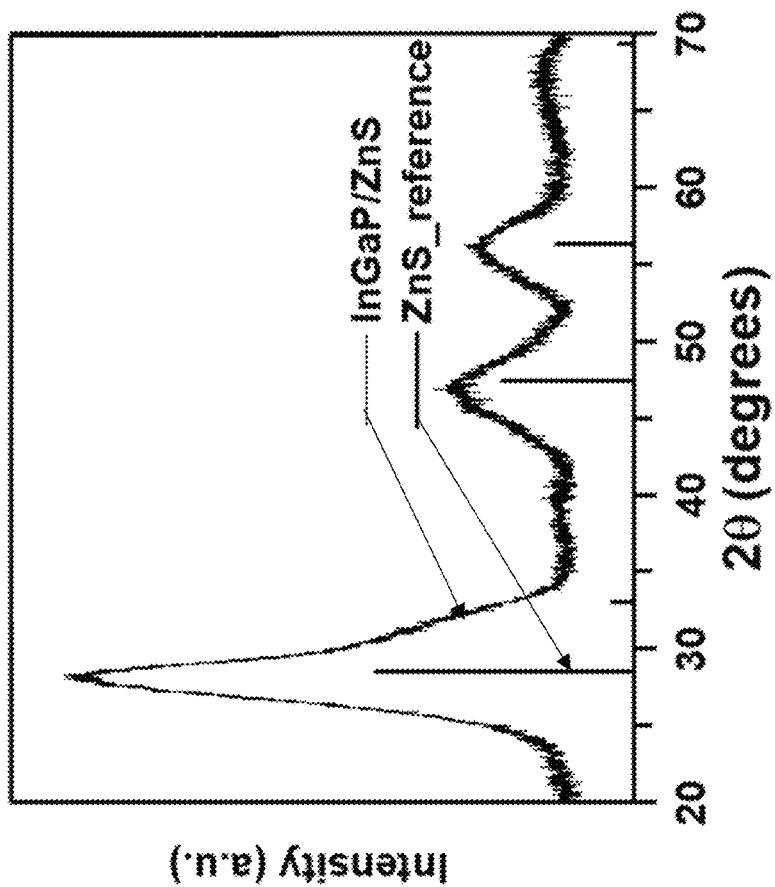
FIG. 5D depicts an XRD pattern of $In_{0.6}Ga_{0.4}P/ZnS$ QDs. HR-TEM images of individual $In_{1-x}Ga_xP/ZnS$ QDs showed clear lattice fringes for the core-shell particles.
Figure 5C:
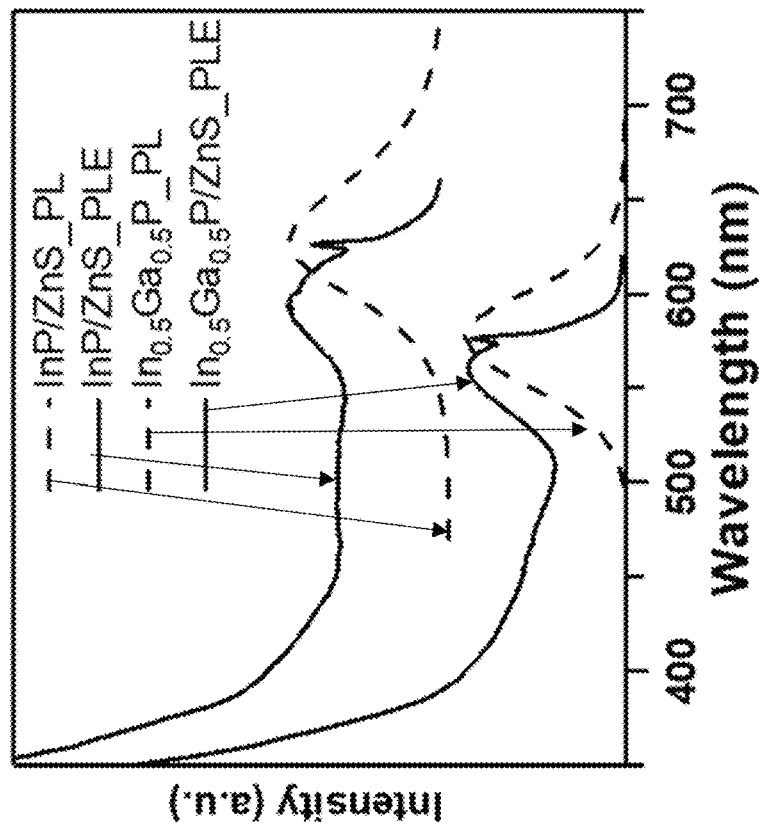
FIG. 5C depicts a comparison of photoluminescence excitation (PLE) spectra for InP/ZnS QDs and $In_{0.5}Ga_{0.5}P/ZnS$ QDs. The corresponding PL spectra are shown in dashed lines. PLE was measured at the corresponding emission maxima with a slit width of 2 nm.
Figure 10:
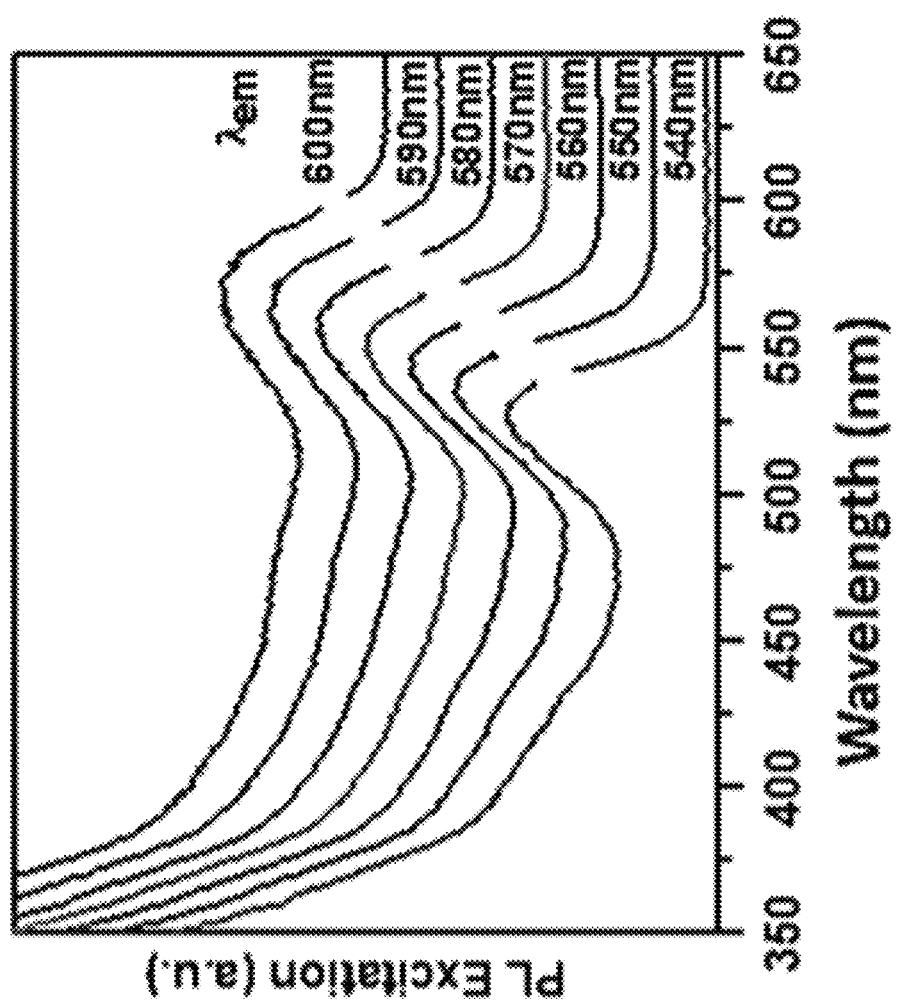
FIG. 10 depicts L excitation spectra for $In_{0.5}Ga_{0.5}P/ZnS$ QDs monitored at different emission wavelengths.

The emission quantum yields of $In_{1-x}Ga_xP$ QDs could be significantly enhanced upon shell growth. Core-only alloy QDs showed emission quantum yields in the range of 1-5%, which increased to 46% upon ZnS shell growth (FIG. 5A). Shell growth could be tracked by monitoring absorption below 350 nm. A type-I band alignment is expected for these core-shell QDs, which is evidenced by the lack of substantial red-shift upon shell growth. $In_{1-x}Ga_xP/ZnS$ core-shell QDs emitting in the range of ~495 nm to ~640 nm could be prepared with quantum yields in the range of 30-40% routinely observed across the size range (FIG. 5B). The incorporation of 50% Ga in InP QDs should reduce the lattice mismatch with the ZnS shell from 7.5% to 4%, which can substantially alleviate the interfacial strain between the core and shell. PL excitation spectra of $In_{0.5}Ga_{0.5}P$/ZnS and InP/ZnS core-shell nanoparticles of similar sizes were measured (FIG. 5C). Significantly narrower PLE spectra were observed for $In_{0.5}Ga_{0.5}P$/ZnS QDs in comparison to InP/ZnS QDs of similar sizes (FIG. 5C). The broadening of PLE spectra for InP/ZnS core shells can be attributed to the lattice strain in these systems. A graded composition of the $In_{1-x}Ga_xP$ core can also explain this observation, which protects significant incorporation of Zn into the QD core, thereby reducing disorder related Stokes shift. A series of PLE spectra collected at different positions of the emission band showed a significant distribution of transition energies in the ensemble (FIG. 10).

Figure 6B:
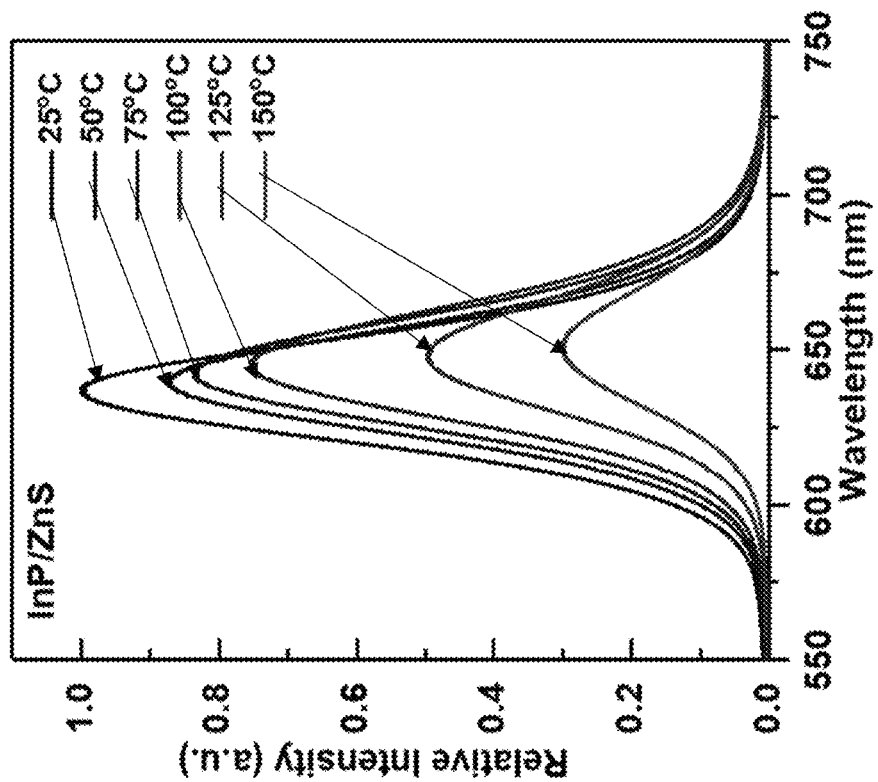
FIG. 6B depicts temperature dependent PL spectra of InP/ZnS QDs immobilized in a matrix of cross-linked poly (lauryl methacrylate).
Figure 6A:
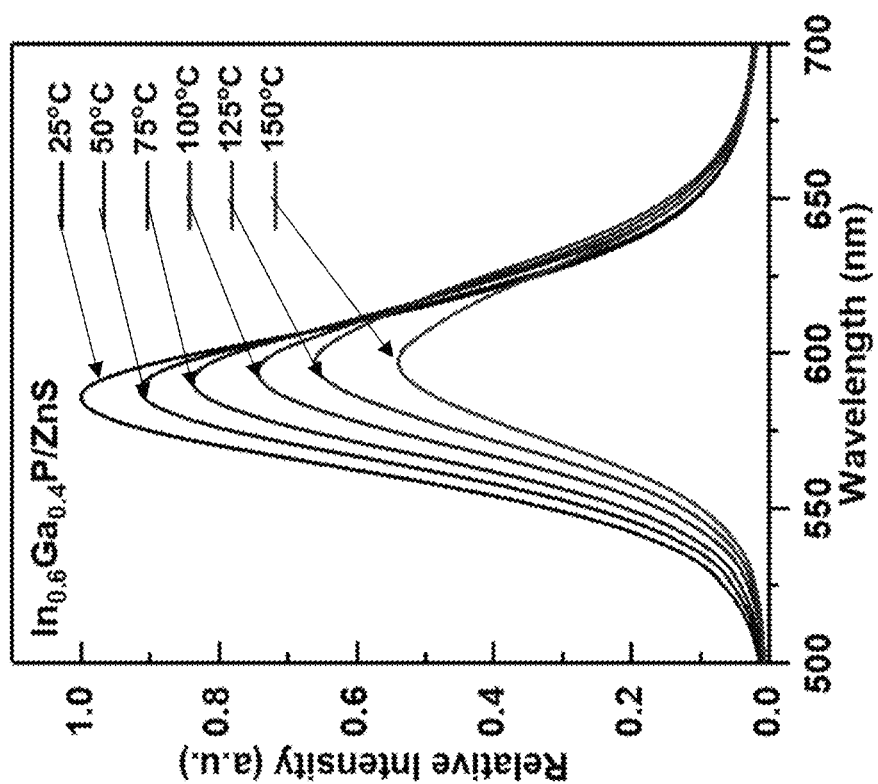
FIG. 6A depicts temperature dependent PL spectra of $In_{0.6}Ga_{0.4}P/ZnS$ QDs immobilized in a matrix of cross-linked poly (lauryl methacrylate).
Figure 6D:
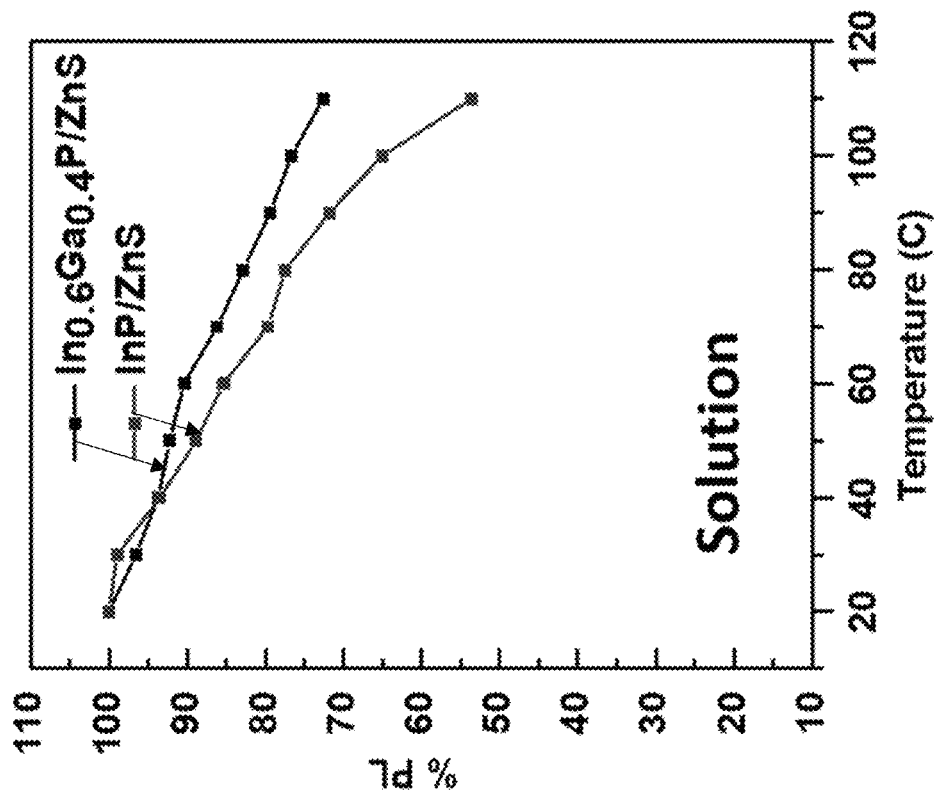
FIG. 6D shows the change in integrated PL area with increase in temperature for $In_{0.6}Ga_{0.4}P/ZnS$ QDs and InP/ZnS QD solutions.
Figure 6C:
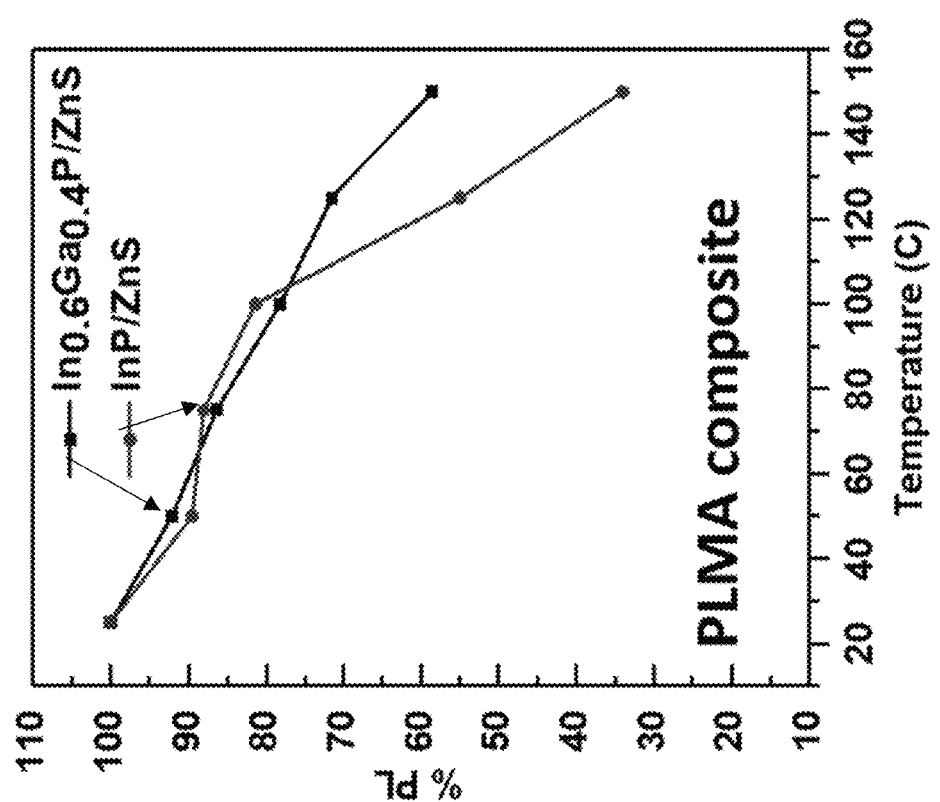
FIG. 6C shows the change in integrated PL area with increase in temperature for $In_{0.6}Ga_{0.4}P/ZnS$ QDs and InP/ZnS QDs immobilized in a polymer matrix.
Figures 11A, 11B:
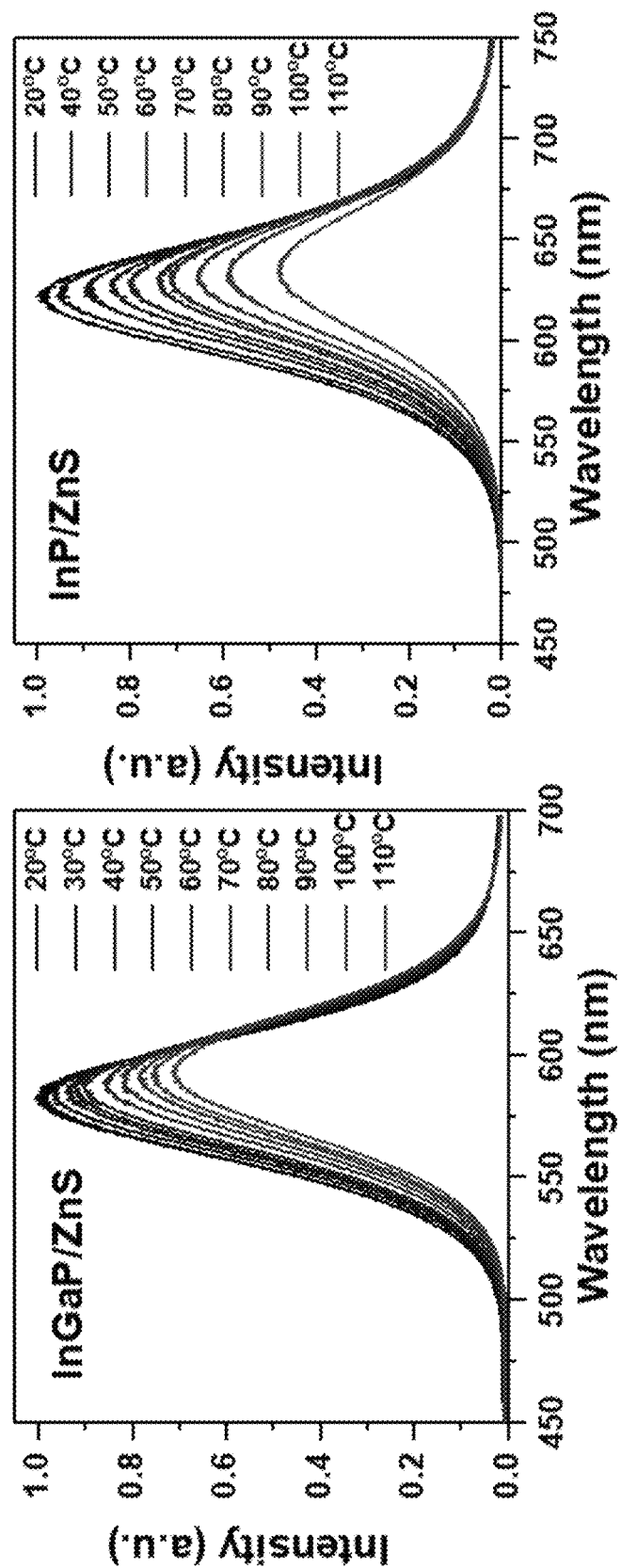
FIGS. 11A and 11B depict temperature dependent PL spectra of $In_{0.6}Ga_{0.4}P/ZnS$ QDs and InP/ZnS QDs dispersed in decane.

For the technological implementation of QDs in LEDs, display panels, and solar concentrators, the retention of luminescence efficiencies at high temperatures (up to 150° C.) is an important requirement. The loss in luminescence efficiency at high temperatures is typically attributed to thermally activated trapping of individual carriers. Although luminescence retention at high temperatures is significantly enhanced upon shell growth, factors like core size, synthesis temperature, and interfacial strain are known to play important roles in determining the thermal stability of PL. The effect of Ga incorporation on the thermal stability of PL in InP/ZnS QDs was examined. InP/ZnS QDs and the $In_{0.6}Ga_{0.4}P$/ZnS alloy QDs with similar core sizes were immobilized in a crosslinked poly-(lauryl methacrylate) matrix, and their PL was measured at elevated temperatures upon excitation with a 473 nm laser (FIGS. 6A and 6B). Whereas the PL of InP/ZnS QDs decreased drastically beyond 100° C. and reduced to ~30% at 150° C., the PL of $In_{0.6}Ga_{0.4}P$/ZnS NCs only decreased to ~60% upon heating to 150° C. (FIG. 6C). Similar results were obtained when temperature dependent PL studies were performed in solution (FIGS. 6D, 11A, and 11B). This significantly better performance of the alloy QDs can be attributed to the reduced lattice mismatch and the resultant low strain at the core-shell interface.

Figures 7A, 7B:
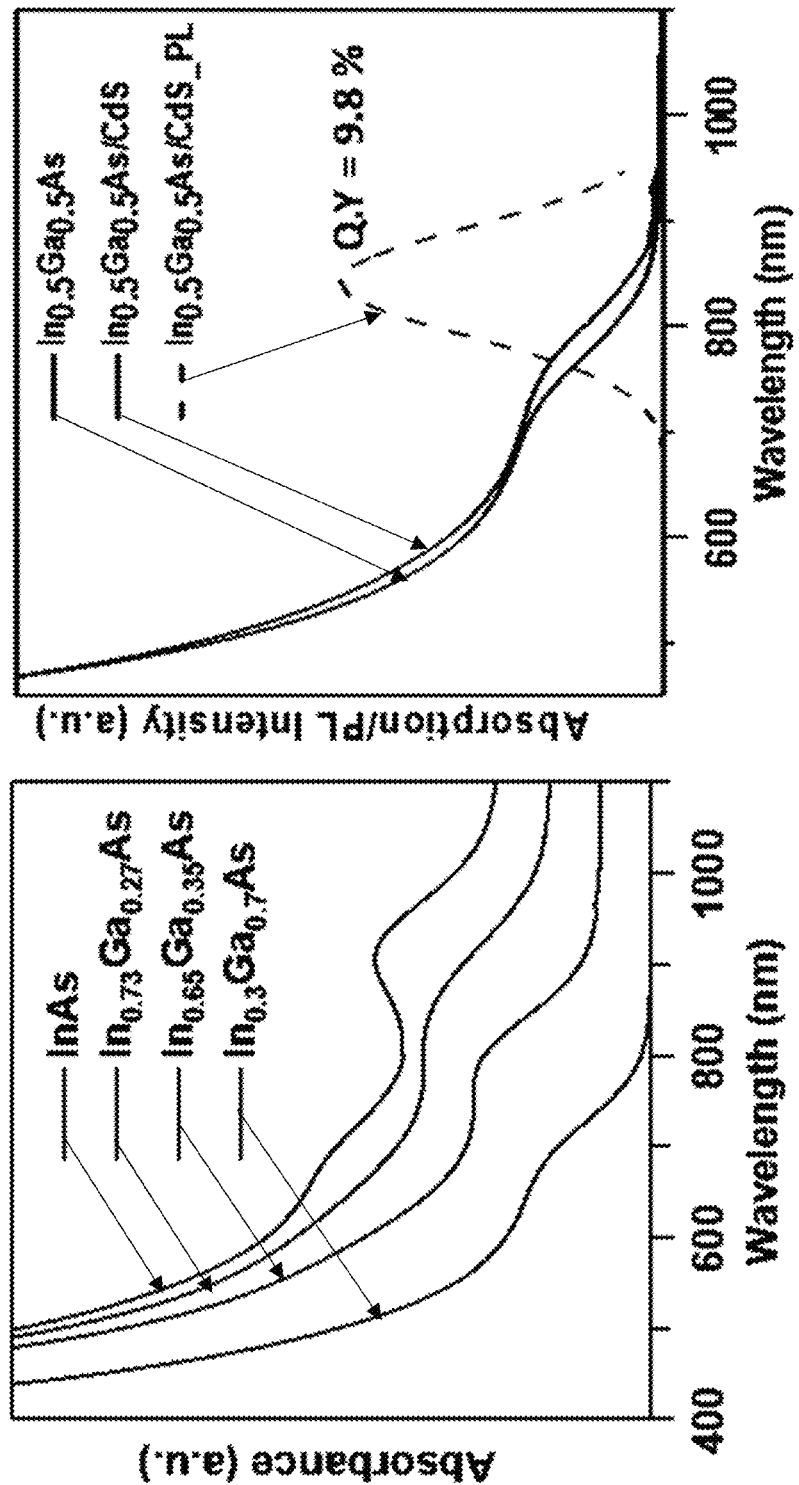
FIG. 7A depicts absorption spectra of starting InAs QDs and $In_{1-x}Ga_xAs$ QDs synthesized from InAs QDs at different temperatures.
FIG. 7B depicts absorption spectra (solid lines) of $In_{0.5}Ga_{0.5}As$ and $In_{0.5}Ga_{0.5}As/CdS$ core-shell QDs and the PL spectrum (dashed) of $In_{0.5}Ga_{0.5}As/CdS$ core-shell QDs.
Figure 12:
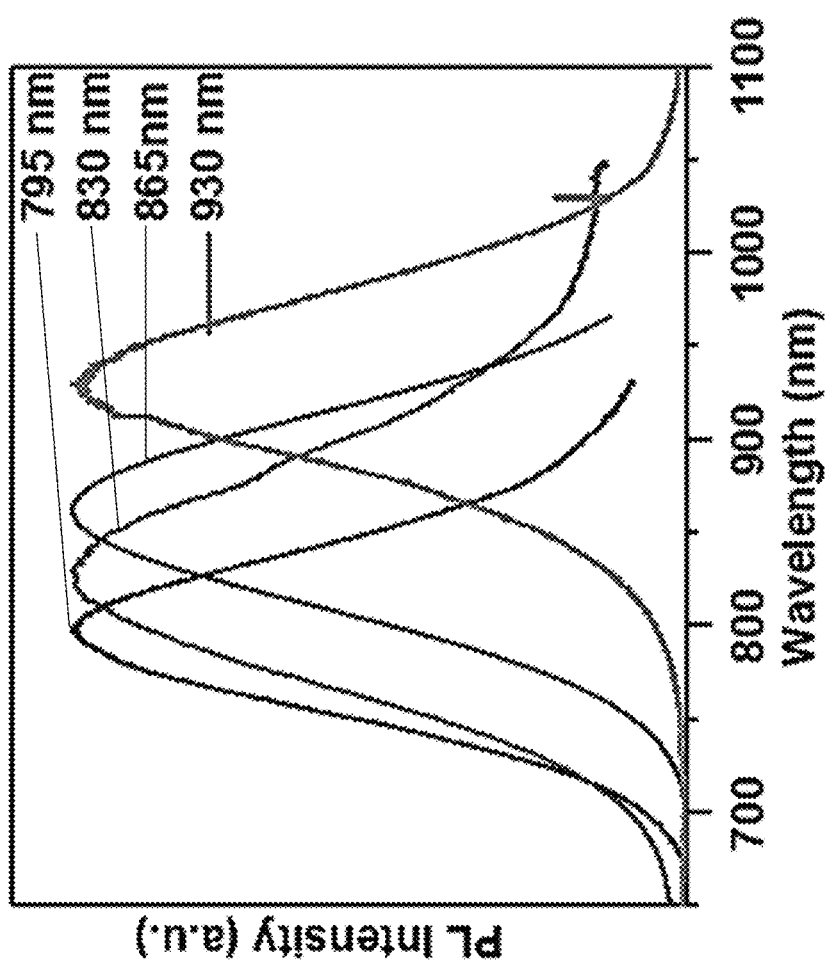
FIG. 12 depicts representative PL spectra of $In_{1-x}Ga_xAs/CdS$ QDs.

The optical properties of $In_{1-x}Ga_xAs$ alloy QDs were qualitatively similar to $In_{1-x}Ga_xP$ QDs. A continuous blue shift of the absorption edge was observed with increasing Ga content in the alloy QDs (FIG. 7A). The excitonic features of the alloys were broader as compared to the initial InAs QDs. Strong band-edge luminescence could be seen upon growing a shell of CdS on $In_{1-x}Ga_xAs$. Shell growth was accompanied by a slight red shift of the excitonic band, likely due to the leakage of the electron wavefunction into the shell. A highest quantum yield of 9.8% was obtained for $In_{0.5}Ga_{0.5}As$/CdS QDs with emission centered at ~860 nm (FIG. 7B). Emission wavelength could be tuned in the biological tissue transparent window of ~750 nm-950 nm by simply varying the alloy composition (FIG. 12). InAs QDs can be used as near infrared (NIR) emitting probes for in-vivo biological imaging. A potential disadvantage of InAs QDs for these applications is that InAs QDs have to be less than ~3 nm in size to emit in the window of ~700-950 nm, which makes them rather unstable. Alloying of Ga in InAs QDs affords larger-sized QDs emitting in this region. The size of $In_{0.5}Ga_{0.5}As$ QDs with an excitonic feature around ~800 nm was estimated to be ~4 nm. 3D PL contour maps on luminescent $In_{0.5}Ga_{0.5}As$/CdS QDs were also measured to estimate the effect of size homogeneity on their absorption and emission properties. The diagonal elongation of spectra features in these PL intensity maps shows that the sample consists of an ensemble of QDs with a range of transition energies. Slicing of these maps gave a series of PL excitation spectra which showed narrow excitonic transitions. Similarly, PL line narrowing experiments allowed for the selective excitation of only a fraction of QDs in the ensemble, which showed narrow PL spectra. Both these experiments demonstrate that the broad emission linewidths in the alloy QDs are not inherent to the alloy and can be improved by further optimization of the synthesis conditions.

Experimental Section

All manipulations with molten salts were performed in a nitrogen filled glove box. The synthesis of InP and InAs QDs was performed based on reported protocols. (Ramasamy, P. et al., *Chemistry of Materials* 2017, 29 (16), 6893-6899; Srivastava, V. et al., *Chemistry of Materials* 2018; and Battaglia, D. et al., *Nano Letters* 2002, 2 (9), 1027-1030.) Details of these syntheses are given in the Additional Experimental Details, below. Details of characterization techniques are also provided below.

Ligand Exchange on InP and InAs QD.

The purified InP and InAs QDs (~0.3 mmol QDs) were transferred to the polar formamide (FA) phase using $(NH_4)_2S$ as inorganic capping ligands. 200 μL volume of 40-48% aq. $(NH_4)_2S$ solution in 10 mL FA and QDs suspended in toluene were stirred together for 20 min to completely transfer the particles to the polar FA phase. The organic phase was removed and fresh toluene was added and the biphasic mixture was stirred for another 15 mins. This process was repeated thrice to completely remove all the organic ligands. The particles were colloidally stable in FA. The particles could be precipitated using excess $CH_3CN$ and dried as powders. These powders were further used for dispersion in the molten salts.

Alternatively, the particles could be transferred from the FA phase to toluene using DDAB as the phase transfer agent. This ligand decomposes cleanly into gaseous products via Hoffman elimination, leaving no organics behind. The toluene phase containing QDs was transferred to a centrifuge tube and precipitated with ethanol to get rid of excess ligands and re-dispersed in 2-3 mL of toluene. This solution was used for dispersion in molten salts. Absorption spectra before and after the ligand exchange were measured in toluene.

Bare InP QDs were prepared by stripping with $HBF_4$ using previously reported protocols. (Nag, A. et al., *Journal of the American Chemical Society* 2011, 133 (27), 10612-10620.) Bare InP QDs were used as powders for dispersion in the molten salts.

Dispersion of InP and InAs QDs in Molten Salt Matrix and Cation Exchange into $In_xGa_{1-x}P$ and $In_xGa_{1-x}As$ QDs.

A eutectic mixture of CsBr:LiBr:KBr (25:56.1:18.9 mol %, (melting point 236° C.)) was taken in a vial and heated to 250° C. under inert atmosphere until a complete liquid phase was formed. The molten salt was cooled to room temperature (r.t.) and grinded into a fine powder. ~0.3 mmol InP/InAs QD powders capped with $S^{2-}$ ligands were then added as powder or as a toluene solution (see section above) to the finally grinded eutectic mixture and heated to 275° C. under stirring for a few hours until a stable solution was obtained. Similar protocols were used for the dispersion of QDs in other molten salts. For cation exchange, ~4-8 molar equivalents of $GaI_3$ (0.5 g-1 g $GaI_3$) was added to the QD/molten salt dispersion as a source of $Ga^{3+}$ cations. $GaCl_3$ or $GaBr_3$ could also be added as a source of $Ga^{3+}$; however, best results were obtained with $GaI_3$ due to its higher boiling point. The mixture was then further heated at 300° C. for 1 h to completely homogenize the QDs and dopant salt. The mixture was cooled to r.t. and then transferred to a furnace, where it was further heated at a desired temperature (380° C.-500° C.) for 1 h in $N_2$ atmosphere. The mixture was cooled to r.t. and the salt matrix was dissolved using excess FA. The cation exchanged QDs were centrifuged. The QDs were washed twice with FA to completely remove the salt matrix. Finally, the QDs were re-dispersed in FA using $(NH_4)_2S$ (~100 uL in 10 mL FA) and transferred to toluene using $DDA^+$ as the counter-ion and used for further characterization. This surface capping procedure is similar to the one described above. Size selection of the crude solution in toluene into a desired number of fractions was performed by sequential precipitation with an appropriate amount of ethanol.

ZnS Shell Growth on $In_{1-x}Ga_xP$ QDs

In a 50 mL 3-neck flask, 0.4 mmol of Zn $(OAc)_2$ and 1 mmol of Oleic acid were mixed in 6 mL ODE. The solution was heated to 120° C. for an hour and cooled to r.t. A toluene solution of the cation exchanged and size-selected $In_{1-x}Ga_xP/S^{2-}/DDA^+$ QDs was injected into this solution. Toluene was first evaporated under vacuum at 60° C., and the solution was then heated to 280° C. under $N_2$. 0.3 mmol S in 3 mL TOP was then injected into this solution at the rate of 1 mL/h using a syringe pump. The reaction temperature was ramped to 300° C., 30 min after the syringe pump injection began. The reaction mixture was cooled to r.t. after the reaction was completed, and the core-shell QDs were washed using toluene/ethanol as the solvent and non-solvent.

CdS Shell Growth on $In_{1-x}Ga_xAs$ QDs

The protocol was similar to the protocol for ZnS shells. Pre-synthesized Cd-oleate was used in this case as the Cd precursor. The reaction temperature was held at 240° C.

Preparation of QD/Polymer Composites

The polymer composites containing InP/ZnS and $In_{1-x}Ga_xP/ZnS$ QDs were prepared according to a reported protocol. (Zhao, Y. et al., ACS Nano 2012, 6 (10), 9058-9067.) The monomer lauryl methacrylate (80 wt %) and cross-linker ethylene glycol dimethyacrylate (20 wt %) were mixed together. A toluene solution of QDs was precipitated using ethanol and re-dispersed in this mixture in a low concentration. For polymerization, 0.3 wt % of azobisisobutyronitrile (AIBN) was added to this mixture, and the combination was heated to 70° C. overnight.

Additional Experimental Details

Chemicals

Indium(III) chloride ($InCl_3$, anhydrous, 99.99%, Puratrem), In(III) acetate ($In(OAc)_3$, 99.99%, Aldrich), tris(trimethylsilyl) phosphine ($(TMS)_3P$, 98%, Strem Chemicals), alane N,N-dimethylethylamine complex (DMEA-Al, 0.5 M solution in toluene, Aldrich), oleylamine (70%, Aldrich), octadecene (90%, Aldrich), oleic acid (90%, Aldrich), tris (dimethylamino) arsine ($As(NMe_2)_3$, 99%, Strem), ammonium sulfide (40-48% in water, Aldrich), formamide (99.5%, Aldrich), didodecyldimethylammonium bromide (DDAB, 98%, Aldrich), potassium bromide (ultra-dry, 99.9%, Alfa Aesar), cesium bromide (ultra-dry, 99.9%, Alfa Aesar), lithium bromide (ultra-dry, 99.9%, Alfa Aesar), gallium iodide (ultra-dry, 99.999%, Alfa Aesar), toluene (anhydrous, 99.8%, Aldrich), ethyl alcohol (anhydrous, ≥99.5%, Aldrich), zinc acetate (99.99%, Aldrich), sulfur (99.998%, Aldrich), trioctylphosphine (97%, Strem Chemicals), lauryl methacrylate (96%, Aldrich), ethylene glycol dimethacrylate (98%, Aldrich). Oleylamine, octadecene and formamide were dried under vacuum before use.

Synthesis of Small InP QDs

Small InP QDs ($\lambda_{max}$=500-540 nm) were synthesized using a slight modification of a reported protocol. (Ramasamy et al., 2017) Indium acetate (0.45 mmol) and oleic acid (1.4 mmol) were mixed with 10 mL of ODE in a 50 mL three-neck flask and fixed to a Schlenk line with a reflux condenser. The mixture was heated to 120° C. under vacuum for 1 h. Then, the flask was refilled with $N_2$ and cooled to r.t. Then, a solution containing 0.3 mmol (0.25 for particles with $\lambda$ max=540 nm) of $(TMS)_3P$ and 1 mL of TOP was quickly injected into the flask. Following the injection, the mixture was heated to 305° C. (15° C./min) and kept at that temperature for 2 min before cooling to r.t. The QDs were precipitated with 50 mL of ethanol and collected by centrifugation. The QDs were washed three times by dispersion in hexane, followed by precipitation by addition of ethanol, and stored in hexane in a vial in a $N_2$ filled glovebox.

Synthesis of Large InP QDs

Large InP QDs ($\lambda$ max>600 nm) were synthesized using a slight modification of reported protocol. Indium acetate (0.45 mmol) and myristic acid (4-6 equivalent, depending on size) were mixed with 10 mL of ODE in a 50 mL three-neck flask and fixed to a Schlenk line with a reflux condenser. The mixture was heated to 120° C. under vacuum for 1 h. Then, the flask was refilled with $N_2$ and cooled to r.t. Then, a solution containing 0.3 mmol (0.25 for particles with $\lambda$ max=540 mu) of $(TMS)_3P$ and 1 mL of TOP was quickly injected into the flask. Following the injection, the mixture was heated to 305° C. (15° C./min) and kept at that temperature for 2 min before cooling to r.t. The QDs were precipitated with 50 mL of ethanol and collected by centrifugation. The QDs were washed three times by dispersion in hexane, followed by precipitation by addition of ethanol, and stored in hexane in a vial in a $N_2$ filled glovebox.

Stock Solution of As Precursor for InAs QDs 0.4 mmol $As(NMe_2)_3$ was dissolved in 1 mL dry oleylamine and kept at 40° C. for 2 mins until bubbles stopped evolving. This bubble formation indicates transamination and the evolution of methylamine.

Synthesis of InAs QDs

InAs QDs were synthesized according to a reported protocol. (Srivastava et al., 2018) In a typical synthesis, 0.4 mmol $InCl_3$ and 6 mL oleylamine were loaded in a 100 mL 3-neck flask and dried at 120° C. under vacuum for 1 h. The reaction mixture was then brought to a desired temperature (150° C.-220° C.) depending on the target QD size. The As stock solution was then quickly injected into the flask followed by the injection of 2.4 mL of 0.5 M DMEA-Al in toluene. The temperature was then further increased to 240° C.-290° C. depending on the target QD sizes. The reaction was cooled to r.t. and transferred into a $N_2$ filled glovebox. The reaction mixture was diluted with 5 mL toluene, and 15 mL ethyl alcohol was added to precipitate the QDs. The washing cycle was repeated twice, and the precipitated particles were redispersed in toluene.

Characterization Techniques

TEM: The images were obtained using 300 KV FEI Tecnai F30 microscope. Samples for TEM were prepared by depositing one droplet of diluted nanocrystal solution in toluene onto a lacey carbon grid from Ted Pella.

Optical absorption measurements: QDs dispersed in toluene were used for absorption measurements. The absorption spectra of the solutions were collected using a Cary 5000 UV-Vis-NIR spectrophotometer. PL and PLE spectra were collected Horiba Fluorolog 3 equipped with Si CCD detector sensitive up to 1050 nm.

Wide-angle powder XRD: The diffraction patterns were obtained using a Bruker D8 diffractometer with Cu Kα X-ray source operating at 40 KV and 40 mA and Vantec 2000 area detector.

ICP-OES: ICP-OES analysis was carried out using an Agilent 700 Series spectrometer. Samples were digested by a mixture of deionized ultrafiltered water and nitric acid ($HNO_3$, ≥69.0%, TraceSELECT, for trace analysis, from Sigma Aldrich) or aqua regia (HCl used for aqua regia was purchased from Sigma Aldrich, ≥37%, TraceSELECT, for trace analysis, fuming) in a plastic container.

Raman Spectroscopy Measurements: Raman spectra were collected on films deposited on glass using a Horiba LabRamHR Evolution confocal Raman microscope. The samples were excited using a 532 nm laser. High temperature PL measurements on QD/Polymer composites were also carried out on this instrument. The composites were excited using a 473 nm laser operating at 0.1% of its power using a 50× long path objective. The PL was detected using the Synapse detector.

SAXS Measurements: SAXS measurements on the colloidal NPs were collected on a SAXSLab Ganesha instrument with Cu Kα radiation. The SAXS curves were analyzed by fitting to a quantitative model in Igor Pro using the Irena package. (Ilavsky, J. et al., *J. Appl. Cryst.* 2009, 42, 347-353.) All scattering curves were firstly fitted with the model independent maximum entropy approach to make sure that the size distributions were symmetric Gaussian. Then the size distributions were extracted using the Modelling II module in the Irena package. Based on TEM data, the particles' form factor was assumed to be spherical with the aspect ratio of 1.

Estimation of Quantum Yields

Quantum yields were calculated with respect to Rhodamine 6G (for $In_{1-x}Ga_xP$) or IR-125 dye (for $In_{1-x}Ga_xAs$) as the reference dyes with solution optical density at the excitation wavelength between 0.05 and 0.1. PL spectra were taken and the integrated areas were used in the following calculation of quantum yield:

$$\varphi = \varphi_{ref} \frac{I_x}{I_{ref}} \frac{A_{ref}}{A_x} \frac{\eta_{st}^2}{\eta_{ref}^2}$$

where x is the sample and ref is Rhodamine 6G/IR-125. The quantum yield of Rhodamine 6G was taken as 0.95 and IR-125 as 0.134. I represents the integrated emission intensity, A represents the optical density in the absorption spectra, and n representing the refractive indices of the solvents. It is important to note that the samples were excited at the wavelength where optical density is equal.

Estimation of Molar Extinction Coefficients

In order to estimate the values of the molar extinction coefficient of InP and $In_{1-x}Ga_xP$ QDs, thoroughly washed samples were characterized by UV-Vis spectroscopy and the particles were subsequently dissolved in aqueous $HNO_3$ digesting solution. The total metal (In+Ga) concentration of each sample was determined by ICP-OES. Once the metal concentrations were determined, the particle concentrations were calculated by using bulk lattice parameters and the average particle size, which were determined by TEM and SAXS measurements.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. Core-shell $In_{1-x}Ga_xP$ nanocrystals, each comprising an $In_{1-x}Ga_xP$ core consisting of only $In_{1-x}Ga_xP$ alloy and having a surface, where 0.2≤x≤0.85, and a ZnS shell on the surface of the $In_{1-x}Ga_xP$ core, wherein the core-shell $In_{1-x}Ga_xP$ nanocrystals absorb blue light and emit green or red photoluminescence, the green or red photoluminescence characterized by a photoluminescence peak maximum in the range from 490 nm to 640 nm and a photoluminescence peak full-width-half-maximum of 60 nm or lower at a temperature of 25° C.

2. The core-shell $In_{1-x}Ga_xP$ nanocrystals of claim 1, wherein the photoluminescence peak full-width-half-maximum is 50 nm or lower.

3. The core-shell $In_{1-x}Ga_xP$ nanocrystals of claim 2, having a photoluminescence quantum yield at 25° C. in the range from 30% to 46%, wherein 0.4≤x≤0.85.

4. The core-shell $In_{1-x}Ga_xP$ nanocrystals of claim 1, wherein the $In_{1-x}Ga_xP$ nanocrystals emit the green photoluminescence characterized by a photoluminescence peak maximum in the range from 500 nm to 600 nm.

5. The core-shell $In_{1-x}Ga_xP$ nanocrystals of claim 4, wherein the photoluminescence peak full-width-half-maximum is 50 nm or lower.

6. The core-shell $In_{1-x}Ga_xP$ nanocrystals of claim 5, wherein the core-shell $In_{1-x}Ga_xP$ nanocrystals have a photoluminescence quantum yield at 25° C. in the range from 30% to 46% and 0.4≤x≤0.85.

7. The core-shell $In_{1-x}Ga_xP$ nanocrystals of claim 1, having a photoluminescence quantum yield at 25° C. in the range from 30% to 46%.

8. The core-shell $In_{1-x}Ga_xP$ nanocrystals of claim 1, wherein 0.4≤x≤0.85.

9. A method of generating light, the method comprising irradiating core-shell $In_{1-x}Ga_xP$ nanocrystals, where 0.2≤x≤0.85, with blue light, wherein the core-shell $In_{1-x}Ga_xP$ nanocrystals absorb the blue light and emit green or red photoluminescence, the green or red photoluminescence characterized by a photoluminescence peak maximum in the range from 490 nm to 640 nm and a photoluminescence peak full-width-half-maximum of 60 nm or lower at a temperature of 25° C., and further wherein each core-shell $In_{1-x}Ga_xP$ nanocrystal comprises an $In_{1-x}Ga_xP$ core consisting of only $In_{1-x}Ga_xP$ alloy and having a surface and a ZnS shell on the surface of the $In_{1-x}Ga_xP$ core.

10. The method of claim 9, wherein the photoluminescence peak full-width-half-maximum is 50 nm or lower.

11. The method of claim 9, wherein the core-shell $In_{1-x}Ga_xP$ nanocrystals emit the green photoluminescence characterized by a photoluminescence peak maximum in the range from 500 nm to 600 nm.

12. The method of claim 11, wherein the photoluminescence peak full-width-half-maximum is 50 nm or lower.

13. The method of claim 9, wherein the core-shell $In_{1-x}Ga_xP$ nanocrystals have a photoluminescence quantum yield at 25° C. in the range from 30% to 46%.

14. The method of claim 9, wherein $0.4 \leq x \leq 0.85$.

15. Core-shell $In_{1-x}Ga_xP$ nanocrystals, each comprising an $In_{1-x}Ga_xP$ core having a surface, where $0.4 \leq x \leq 0.85$, and a ZnS shell around the $In_{1-x}Ga_xP$ core, wherein the ZnS shell is in contact with the surface of the $In_{1-x}Ga_xP$ core where it is present around said core, and further wherein the core-shell $In_{1-x}Ga_xP$ nanocrystals absorb blue light and emit green or red photoluminescence, the green or red photoluminescence characterized by a photoluminescence peak maximum in the range from 490 nm to 640 nm and a photoluminescence peak full-width-half-maximum of 60 nm or lower at a temperature of 25° C.

16. The core-shell $In_{1-x}Ga_xP$ nanocrystals of claim 15, wherein the core-shell $In_{1-x}Ga_xP$ nanocrystals have a photoluminescence quantum yield at 25° C. in the range from 30% to 46%.

17. The core-shell $In_{1-x}Ga_xP$ nanocrystals of claim 15, wherein the photoluminescence peak full-width-half-maximum is 50 nm or lower.

18. A method of generating light, the method comprising irradiating core-shell $In_{1-x}Ga_xP$ nanocrystals, where $0.4 \leq x \leq 0.85$, with blue light, wherein the core-shell $In_{1-x}Ga_xP$ nanocrystals absorb the blue light and emit green or red photoluminescence, the green or red photoluminescence characterized by a photoluminescence peak maximum in the range from 490 nm to 640 nm and a photoluminescence peak full-width-half-maximum of 60 nm or lower at a temperature of 25° C., and further wherein each core-shell $In_{1-x}Ga_xP$ nanocrystal comprises an $In_{1-x}Ga_xP$ core having a surface and a ZnS shell around the $In_{1-x}Ga_xP$ core, wherein the ZnS shell is in contact with the surface of the $In_{1-x}Ga_xP$ core where it is present around said core.

19. The method of claim 18, wherein the core-shell $In_{1-x}Ga_xP$ nanocrystals have a photoluminescence quantum yield at 25° C. in the range from 30% to 46%.

20. The method of claim 18, wherein the photoluminescence peak full-width-half-maximum is 50 nm or lower.

\* \* \* \* \*